US011223394B2

(12) United States Patent
Lee et al.

(10) Patent No.: US 11,223,394 B2
(45) Date of Patent: Jan. 11, 2022

(54) ANTENNA VIRTUALIZATION IN TWO-DIMENSIONAL ANTENNA ARRAY

(71) Applicant: INTERDIGITAL PATENT HOLDINGS, INC., Wilmington, DE (US)

(72) Inventors: Moon-il Lee, Melville, NY (US); Afshin Haghighat, Ile-Bizard (CA); Meilong Jiang, Plainsboro, NJ (US); Janet A. Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/525,676

(22) PCT Filed: Nov. 12, 2015

(86) PCT No.: PCT/US2015/060381
§ 371 (c)(1),
(2) Date: May 10, 2017

(87) PCT Pub. No.: WO2016/077584
PCT Pub. Date: May 19, 2016

(65) Prior Publication Data
US 2018/0294847 A1    Oct. 11, 2018

Related U.S. Application Data

(60) Provisional application No. 62/080,008, filed on Nov. 14, 2014.

(51) Int. Cl.
*H04B 7/04* (2017.01)
*H04B 7/0417* (2017.01)
(Continued)

(52) U.S. Cl.
CPC ......... *H04B 7/0417* (2013.01); *H04B 7/0456* (2013.01); *H04B 7/0469* (2013.01);
(Continued)

(58) Field of Classification Search
CPC ... H04L 5/0048; H04B 7/0417; H04B 7/0619; H04B 7/0456; H04B 7/0469; H04B 7/0617; H04B 7/0413
See application file for complete search history.

(56) References Cited

U.S. PATENT DOCUMENTS 8,467,469 B2   6/2013   Lee et al.
9,680,539 B2 *  6/2017  Shimezawa .......... H04B 7/0456
(Continued)

FOREIGN PATENT DOCUMENTS

CN    102792605 A    11/2012
CN    103401639 A    11/2013

OTHER PUBLICATIONS

3rd Generation Partnership Project(3GPP), TS 36.211 V11.4.0, "Technical Specification Group Radio Access Network, Evolved Universal Terrestrial Radio Access (E-UTRA), Physical Channels and Modulation (Release 11)", Sep. 2013, pp. 1-120.
(Continued)

*Primary Examiner* — Jean B Corrielus
(74) *Attorney, Agent, or Firm* — Condo Roccia Koptiw LLP

(57) ABSTRACT

Systems, methods, and instrumentalities are disclosed for antenna virtualization, e.g., in at least a two-dimensional antenna array. $N_E$ physical antenna elements may be virtualized to Np logical antenna ports. A virtualization may be WTRU-specific, which may optimize MIMO performance. A simplified MIMO scheme may be used with A reduction in feedback, reference signal, and/or control signaling overhead. Antenna virtualization schemes may utilize channel
(Continued)

characteristics. Antenna virtualization may be defined, for example, based on antenna port to antenna element mapping, based on a measurement reference signal, based on a codebook or a codebook subset or based on an antenna virtualization matrix. One or more antenna virtualization schemes may be configured in a cell. Antenna virtualization schemes may be configured in a WTRU-specific manner, perhaps for example based on a WTRU channel characteristic(s). A WTRU may report one or more useful (e.g., optimized) antenna virtualization schemes, e.g., based on one or more measurements.

12 Claims, 21 Drawing Sheets

(51) Int. Cl.
  *H04L 5/00* (2006.01)
  *H04B 7/0456* (2017.01)
  *H04B 7/06* (2006.01)
  *H04B 7/0413* (2017.01)
(52) U.S. Cl.
  CPC ......... *H04B 7/0617* (2013.01); *H04B 7/0619* (2013.01); *H04L 5/0048* (2013.01); *H04B 7/0413* (2013.01)

(56) References Cited

U.S. PATENT DOCUMENTS

| | | | | |
|---|---|---|---|---|
| 2006/0066483 | A1* | 3/2006 | Goldberg | H04B 7/08 342/378 |
| 2008/0100510 | A1* | 5/2008 | Bonthron | G01S 7/024 342/373 |
| 2008/0144733 | A1 | 6/2008 | ElGamal et al. | |
| 2011/0223876 | A1* | 9/2011 | Kang | H04B 7/0473 455/129 |
| 2011/0305263 | A1* | 12/2011 | Jongren | H04B 7/0617 375/219 |
| 2012/0027111 | A1* | 2/2012 | Vook | H04B 7/0452 375/267 |
| 2012/0275386 | A1* | 11/2012 | Frenne | H04B 7/0417 370/328 |
| 2013/0039284 | A1* | 2/2013 | Marinier | H04L 5/001 370/329 |
| 2013/0182750 | A1* | 7/2013 | Zhang | H04B 7/0469 375/219 |
| 2014/0098689 | A1 | 4/2014 | Lee et al. | |
| 2014/0177744 | A1 | 6/2014 | Krishnamurthy et al. | |
| 2014/0220902 | A1* | 8/2014 | Clevorn | H04B 7/061 455/63.4 |
| 2014/0334565 | A1* | 11/2014 | Tzanidis | H04B 7/0456 375/267 |
| 2014/0355707 | A1* | 12/2014 | Kim | H04B 7/0469 375/267 |
| 2015/0162966 | A1* | 6/2015 | Kim | H04B 17/00 370/252 |
| 2015/0288499 | A1* | 10/2015 | Nam | H04L 1/0026 370/329 |
| 2015/0326293 | A1* | 11/2015 | Lee | H04B 7/0465 370/329 |
| 2015/0358060 | A1* | 12/2015 | Park | H04B 7/0473 370/329 |
| 2017/0064675 | A1* | 3/2017 | Kim | H04B 7/068 |
| 2017/0085303 | A1* | 3/2017 | Chen | H04W 72/046 |

OTHER PUBLICATIONS

3rd Generation Partnership Project(3GPP), TS 36.212 V11.3.0, "Technical Specification Group Radio Access Network, Evolved Universal Terrestrial Radio Access (E-UTRA), Multiplexing and Channel Coding (Release 11)", Jun. 2013, pp. 1-84.

3rd Generation Partnership Project(3GPP), TS 36.213 V11.4.0, "Technical Specification Group Radio Access Network, Evolved Universal Terrestrial Radio Access (E-UTRA), Physical Layer Procedures (Release 11)", Sep. 2013, pp. 1-182.

3rd Generation Partnership Project(3GPP), TS 36.304 V12.1.0, "Technical Specification Group Radio Access Network, Evolved Universal Terrestrial Radio Access (E-UTRA), User Equipment (UE) Procedures in Idle Mode (Release 12)", Jun. 2014, pp. 1-35.

3rd Generation Partnership Project(3GPP), TS 36.331 V11.4.0, "Technical Specification Group Radio Access Network, Evolved Universal Terrestrial Radio Access (E-UTRA), Radio Resource Control (RRC), Protocol Specification (Release 11)", Jun. 2013, pp. 1-346.

3rd Generation Partnership Project(3GPP), TS 36.211 V8.0.0, "Technical Specification Group Radio Access Network, Evolved Universal Terrestrial Radio Access (E-UTRA), Physical Channels and Modulation (Release 8)", Sep. 2007, pp. 1-50.

* cited by examiner (a) CO-POLARIZATION (4,4,1)

(b) CROSS-POLARIZATION (4,4,2)

US 11,223,394 B2

ANTENNA VIRTUALIZATION IN TWO-DIMENSIONAL ANTENNA ARRAY

CROSS-REFERENCE TO RELATED APPLICATIONS

This application is the National Stage entry under 35 U.S.C. § 371 of Patent Cooperation Treaty Application PCT/US2015/060381, filed Nov. 12, 2015, which claims the benefit of U.S. Provisional Patent Application No. 62/080,008, filed on Nov. 14, 2014, the entire contents of all of which are hereby incorporated by reference as if fully set-forth herein, for all purposes.

BACKGROUND

Antenna virtualization may permit resource allocation and/or configuration. However, some antenna virtualization techniques may lead to suboptimal performance.

SUMMARY

Systems, methods, and instrumentalities are disclosed for antenna virtualization in at least a two-dimensional antenna array. $N_E$ physical antenna elements may be virtualized to $N_P$ logical antenna ports. A virtualization may be wireless transmit/receive unit (WTRU) specific (a WTRU may in some embodiments be referred to as a User Equipment (UE), e.g., UE-specific), which may optimize MIMO performance A (e.g., simplified) MIMO scheme may be used with reduction in feedback, reference signal, and/or control signaling overhead. Antenna virtualization schemes may utilize one or more channel characteristics. Antenna virtualization may be defined, for example, based on antenna port to antenna element mapping, based on a measurement reference signal, based on a codebook or a codebook subset, and/or based on an antenna virtualization matrix. One or more, or multiple, antenna virtualization schemes may be configured in a cell. Antenna virtualization schemes may be configured in a WTRU-specific manner, perhaps for example based on one or more WTRU channel characteristics. A WTRU may report a useful (e.g., relatively best optimized) antenna virtualization scheme, e.g., based on a measurement.

One or more techniques may be performed by a wireless transmit/receive unit (WTRU). Techniques may include receiving, via a receiver, at least one downlink (DL) reference signal. Techniques may include determining, via a processor, perhaps for example based on the DL reference signal, at least one antenna virtualization matrix of a plurality of antenna virtualization matrices. Techniques may include determining, via the processor, a codebook, perhaps for example based on the at least one antenna virtualization matrix. Techniques may include transforming a first two-dimensional (2D), or more, antenna array into a second 2D, or more, antenna array using the at least one antenna virtualization matrix. The second 2D, or more, array being smaller than the first 2D, or more, array. Techniques may include transmitting, via a transmitter, feedback to an evolved-node B (eNB), perhaps for example using at least a part of the codebook.

One or more wireless transmit/receive units (WTRU) may be configured to perform one or more techniques. A WTRU may comprise a receiver. The receiver may be configured to receive at least one downlink (DL) reference signal. The WTRU may comprise a processor. The processor may be configured at least to determine, perhaps for example based on the DL reference signal, at least one antenna virtualization matrix of a plurality of antenna virtualization matrices. The processor may be configured to determine a codebook, perhaps for example based on the at least one antenna virtualization matrix. The processor may be configured to transform a first at least two-dimensional (2D) antenna array into a second at least 2D antenna array, perhaps for example using the at least one antenna virtualization matrix. The second at least 2D array may be smaller than the first at least 2D array. The WTRU may comprise a transmitter. The transmitter may be configured at least to send feedback to an evolved-node B (eNB), perhaps for example using at least a part of the codebook.

One or more evolved-Node Bs (eNBs) may be configured to perform one or more techniques. An eNB may comprise a transmitter. The transmitter may be configured to at least send at least one downlink (DL) reference signal to a wireless transmit/receive unit (WTRU). The transmitter may be configured to send a plurality of antenna virtualization matrices to the WTRU. The eNB may comprise a receiver. The receiver may be configured to at least receive an indication of at least one antenna virtualization matrix of the plurality of antenna virtualization matrices. The receiver may be configured to receive feedback from the WTRU. The feedback may be sent using at least a part of the codebook corresponding to the at least one antenna virtualization matrix. The eNB may comprise a processor. The processor may be configured at least to determine to send to the WTRU a confirmation of the at least one antenna virtualization matrix, and/or an indication of another antenna virtualization matrix of the plurality of virtualization matrices.

BRIEF DESCRIPTION OF THE DRAWINGS

A more detailed understanding may be had from the following description, given by way of example in conjunction with the accompanying drawings.

DETAILED DESCRIPTION

A detailed description of illustrative embodiments will now be described with reference to the various Figures. Although this description provides a detailed example of possible implementations, it should be noted that the details are intended to be examples and in no way limit the scope of the application. As used herein, the articles "a" and "an", absent further qualification or characterization, may be understood to mean "one or more" or "at least one", for example.

Figure 1A:
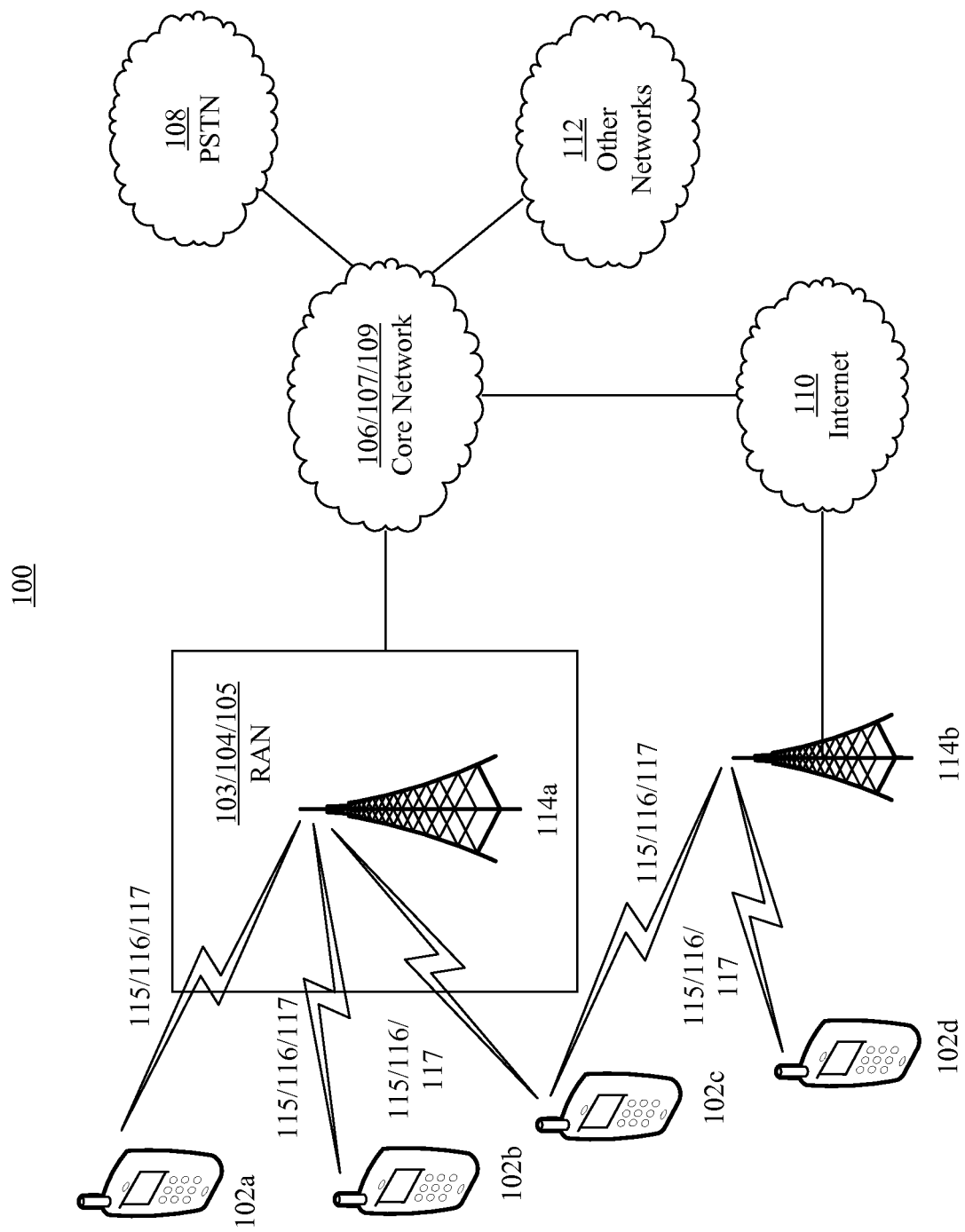
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs), e.g., UEs, 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in some embodiments, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In some embodiments, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
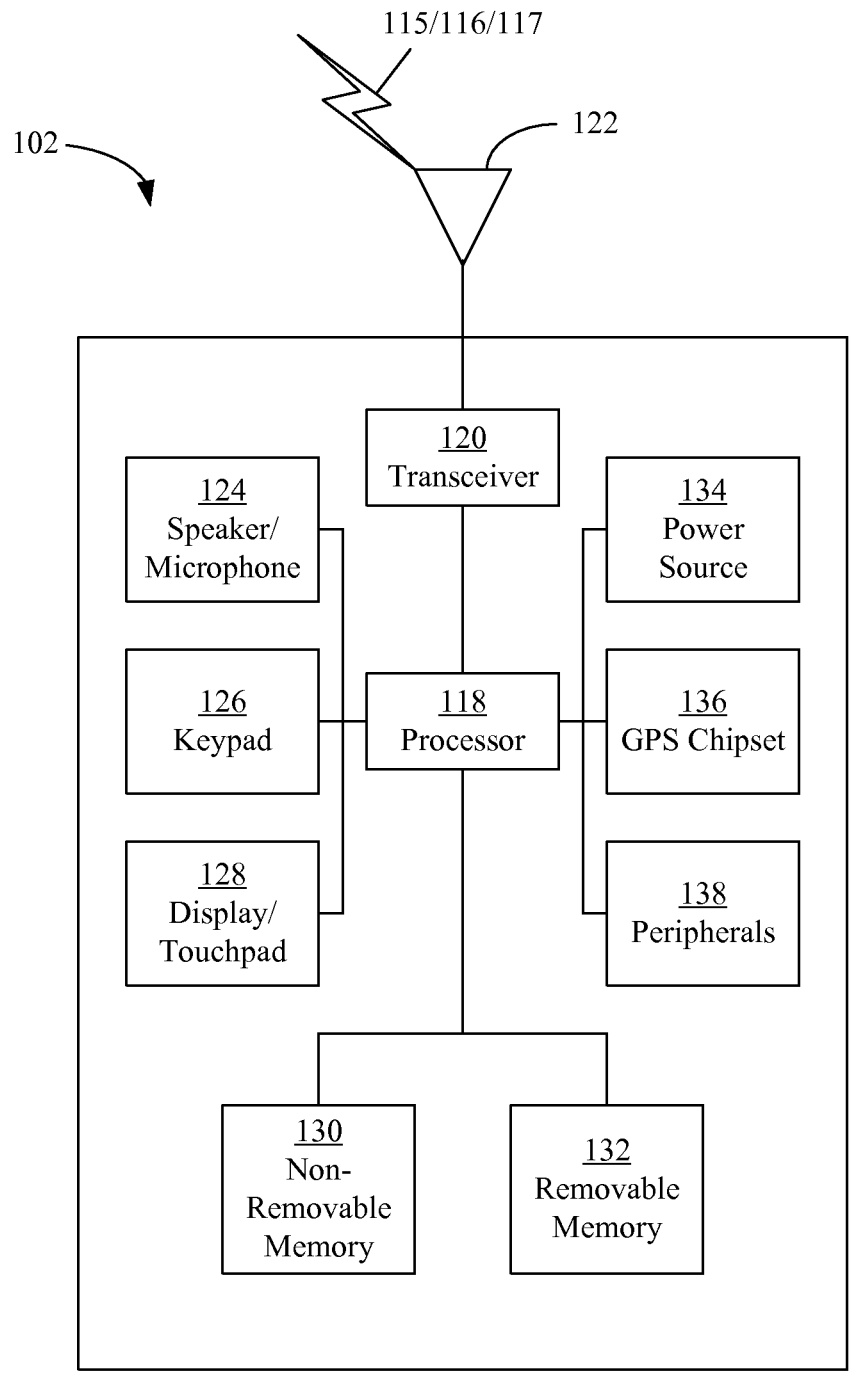
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in some embodiments, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in some embodiments, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
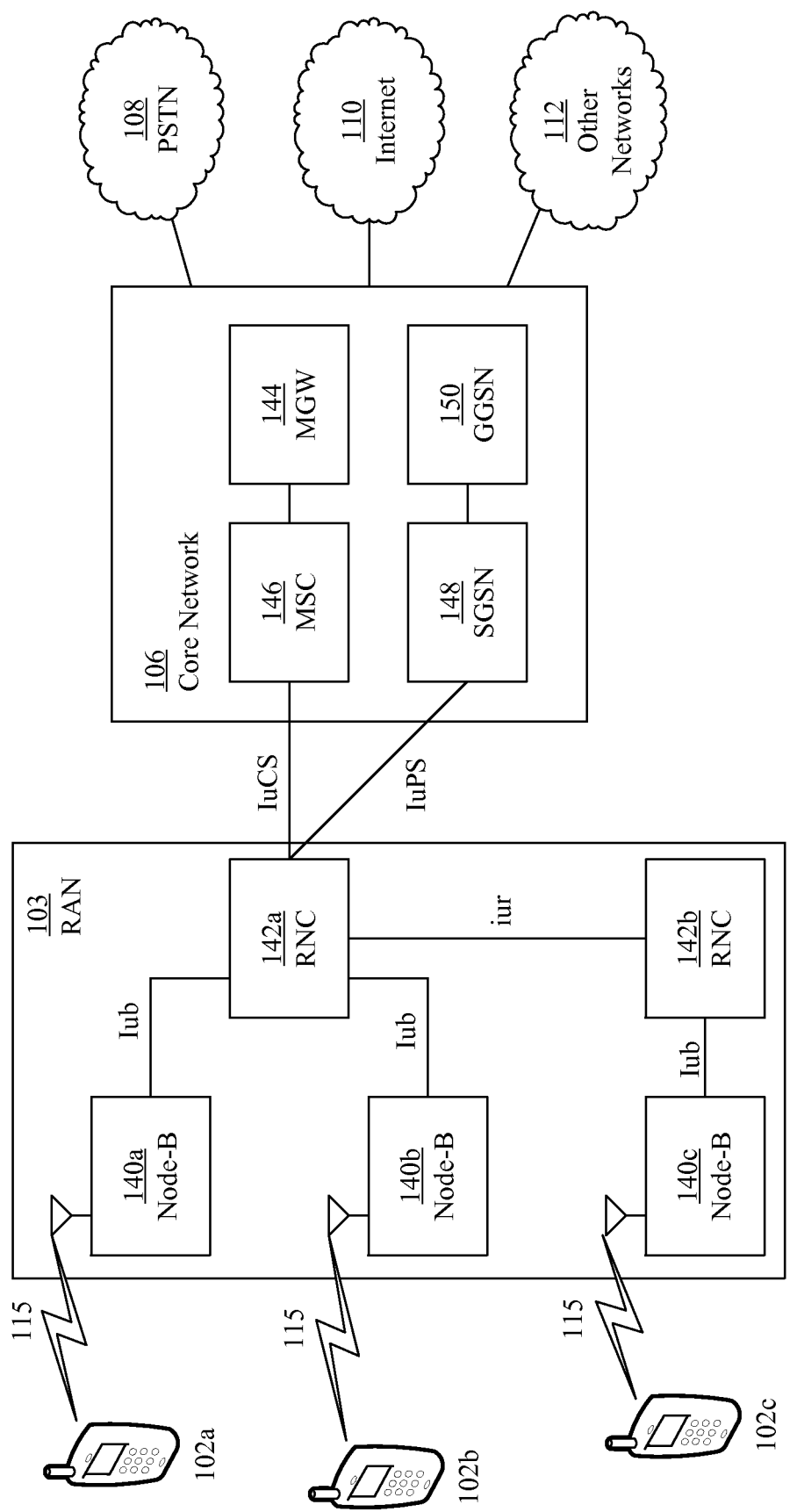
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
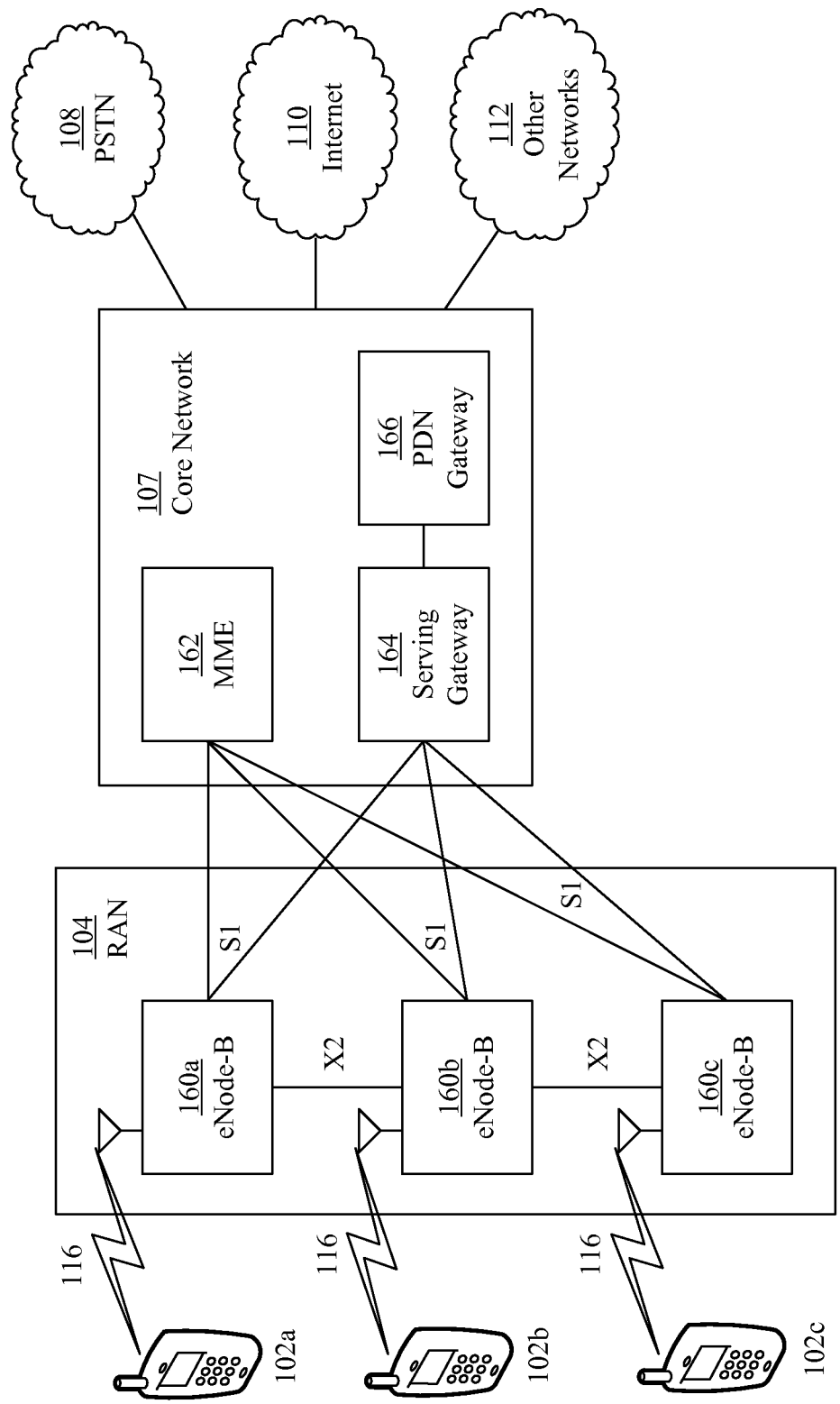
FIG. 1D is a system diagram an example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In some embodiments, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

FIG. E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

Figure 1E:
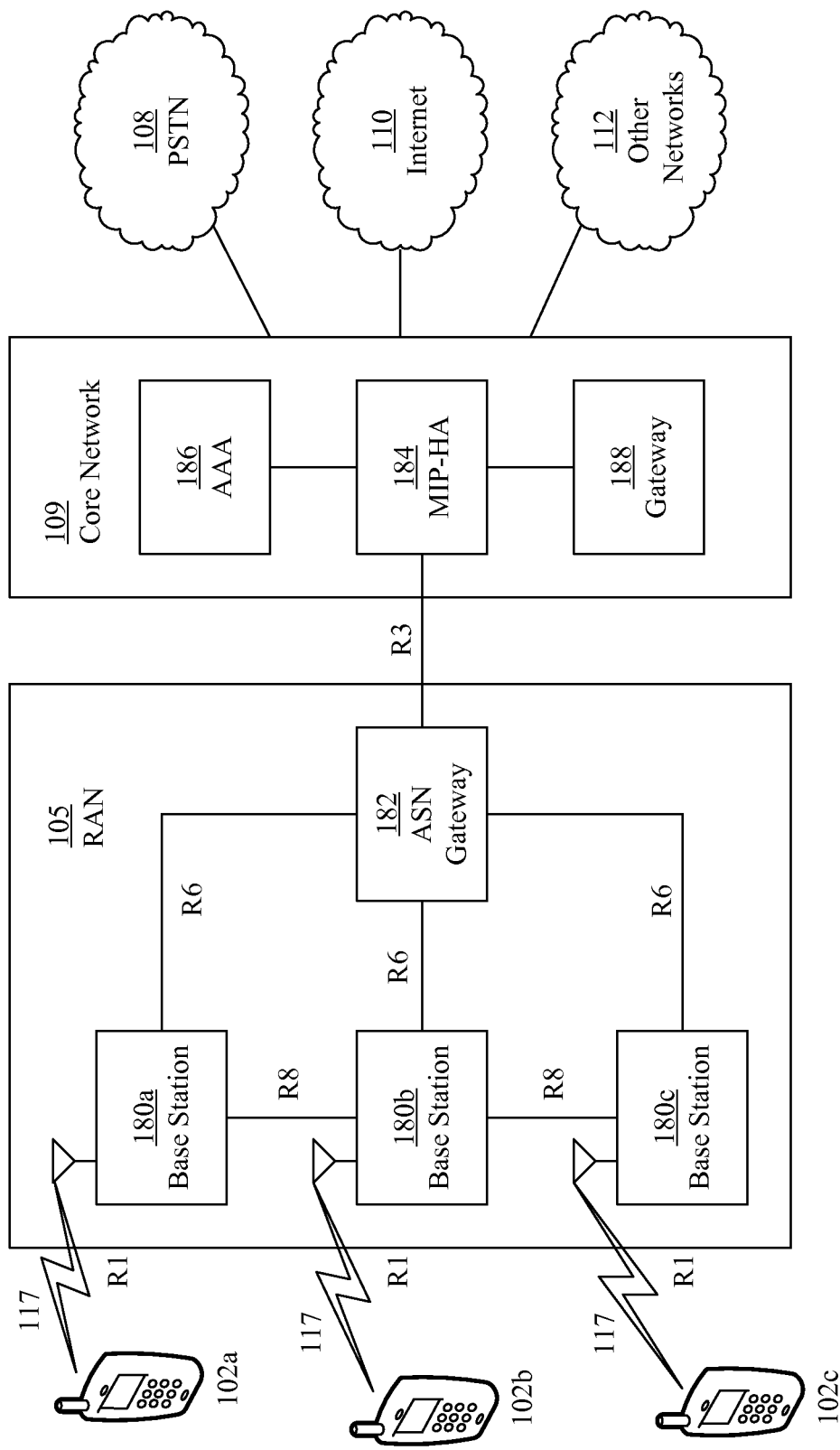
FIG. 1E is a system diagram an example radio access network and another example core network that may be used within the communications system illustrated in FIG. 1A.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In some embodiments, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Systems, methods, and instrumentalities are disclosed for antenna virtualization, for example, in a least a two-dimensional antenna array. $N_E$ physical antenna elements may be virtualized to $N_P$ logical antenna ports. A virtualization may be WTRU-specific, which may optimize MIMO performance. A simplified MIMO scheme may be used with reduction in feedback, reference signal, and/or control signaling overhead. One or more antenna virtualization schemes may utilize one or more channel characteristics. Antenna virtualization may be defined, for example, based on antenna port to antenna element mapping, based on a measurement reference signal, based on a codebook or a codebook subset, and/or based on an antenna virtualization matrix. One or more, or multiple, antenna virtualization schemes may be configured in a cell. One or more antenna virtualization schemes may be configured in a WTRU-specific manner based on a WTRU channel characteristic. A WTRU may report a useful (e.g., relatively best optimized) antenna virtualization scheme, e.g., based on a measurement.

MIMO techniques for one dimensional (1D) antenna configurations may, for example, define antenna ports in a horizontal domain. The number of antenna ports may be limited, for example, due to the limited space of the transmitter site and/or due to a certain level of antenna spacing to provide MIMO gain. MIMO schemes may be implemented in two dimensional (2D) antenna arrays, which may allow a larger number of antenna elements at a transmitter and/or additional control of antennas in the vertical domain. A higher system performance may be achieved by exploiting a higher degree of freedom of the spatial channel.

Figure 2:
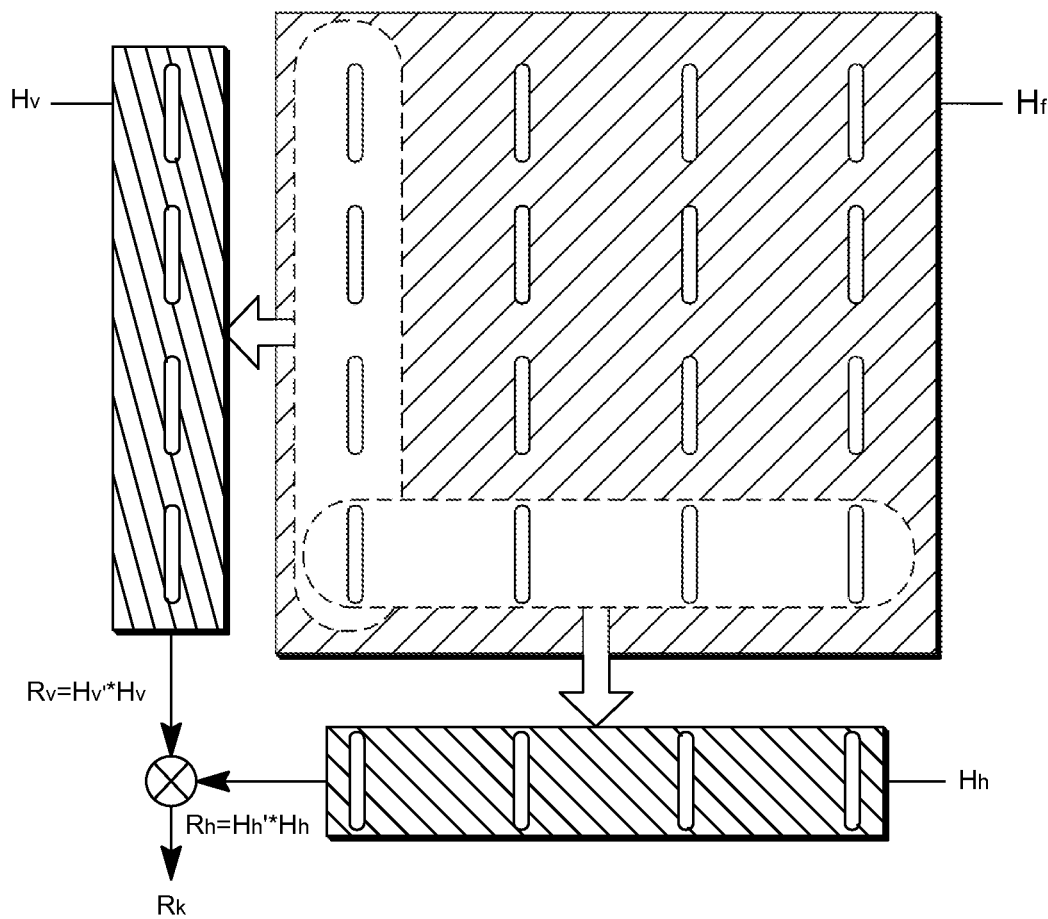
FIG. 2 is an example of a 2D antenna array with co-polarized antenna elements.
Figure 3:
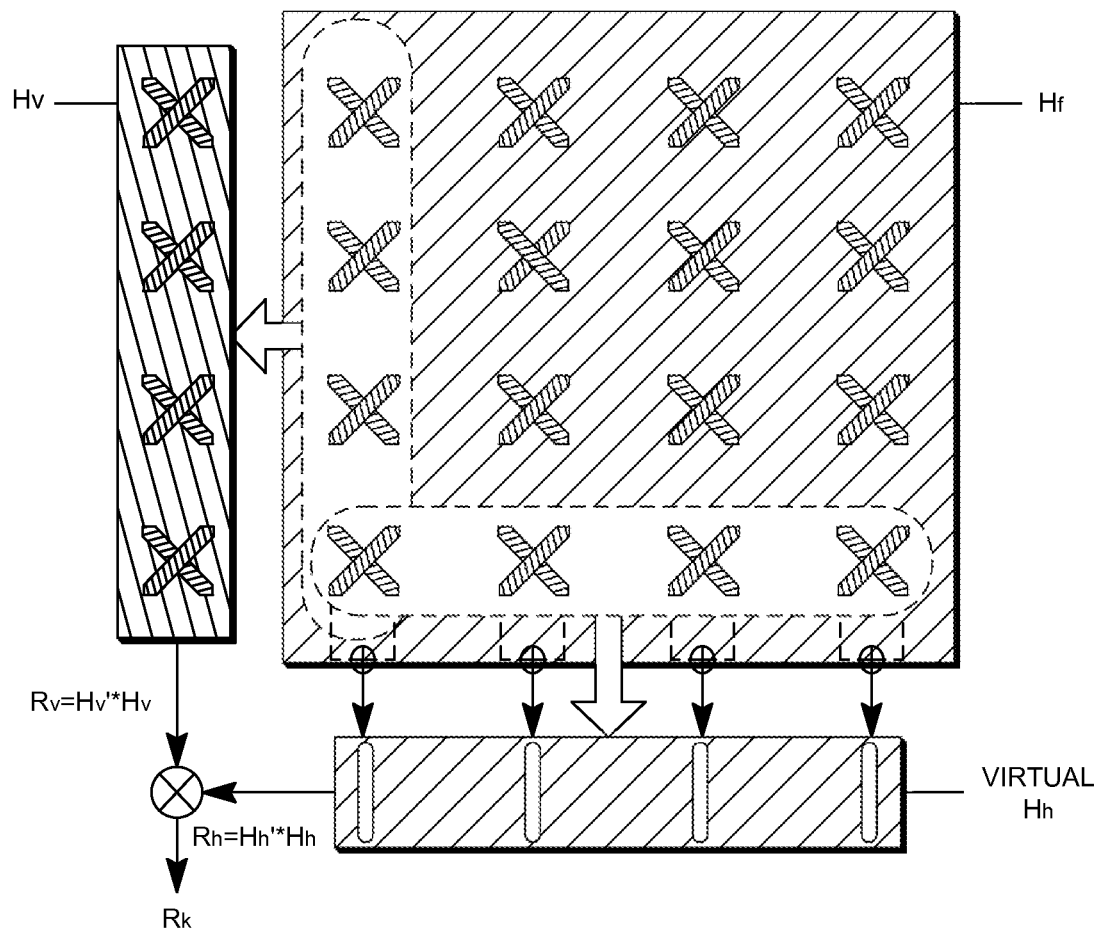
FIG. 3 is an example of a 2D antenna array with cross-polarized antenna elements.

FIG. 2 is an example of a 2D antenna array with co-polarized antenna elements. FIG. 3 is an example of a 2D antenna array with cross-polarized antenna elements. One or more, or each, antenna configuration may be defined, for example, by parameters (N, M, K), where N, M, and/or K represent the number of antenna columns, number of antenna rows, and/or polarization, respectively.

Figure 4:
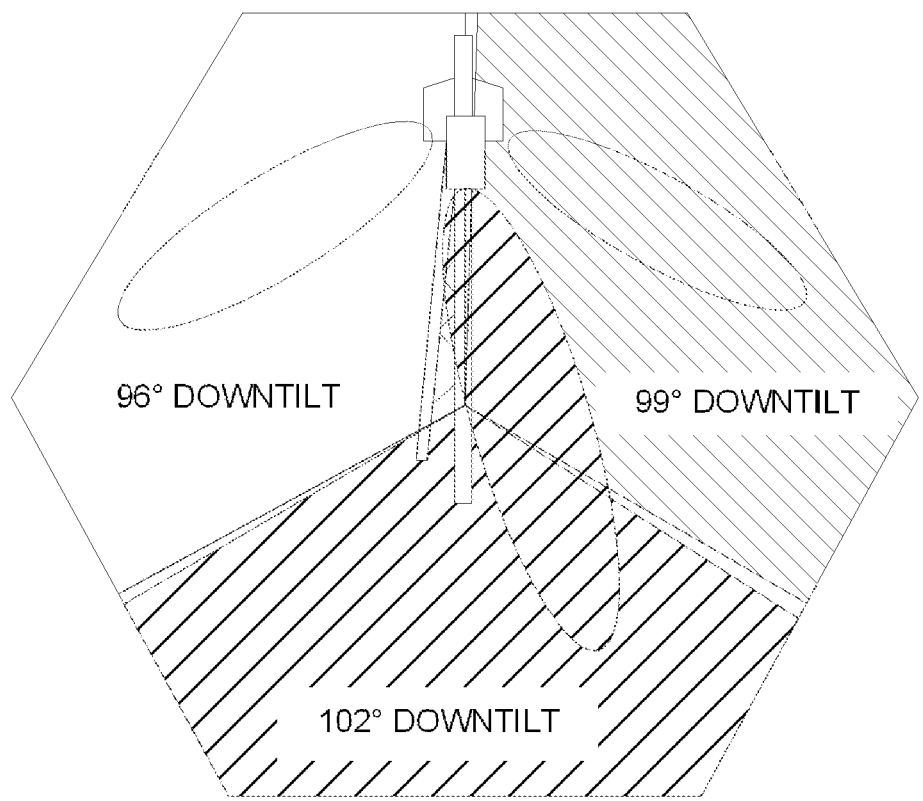
FIG. 4 is an example of elevation beamforming.
Figure 5:
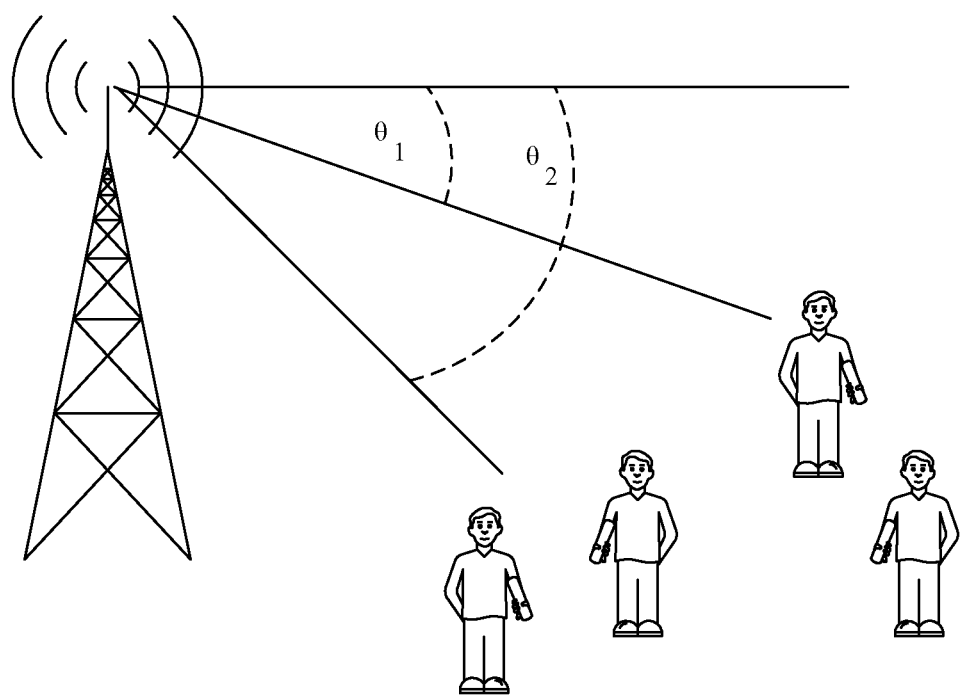
FIG. 5 is an example of vertical sectorization.

FIG. 4 is an example of elevation beamforming, e.g., via adaptive downtilt. FIG. 5 is an example of vertical sectorization. Elevation beamforming and/or vertical sectorization techniques may be considered in MIMO techniques to exploit vertical antenna ports. Elevation beamforming, which may also be referred to as adaptive downtilt, may form a beam in the vertical dimension to increase beamforming gain. Elevation beamforming may minimize inter-cell interference, for example, by reducing signal power to neighbor cell. As a result of less interference, system throughput may be increased. Vertical sectorization may exploit spatial reuse gain, for example, by forming one or more, or multiple, vertical beams in a cell. One or more, or each, vertical beam may correspond to a sector.

Antenna virtualization may be implemented in a 2D antenna array. A 2D antenna array may be defined as (N, M, K), where N, M and K represent the number of antenna columns, number of antenna rows, and/or polarization, respectively. As shown in FIGS. 2 and 3, N×M×K antenna elements may be used. In a given 2D antenna configuration, the number of antenna ports may depend on the number of RF chains and/or transmit and receive units (TXRUs) used. An antenna element may be regarded as a physical antenna implemented in a 2D antenna array. An antenna port may be regarded as a logical antenna seen by a wireless transmit/receive unit (WTRU). A WTRU may also be referred to as User Equipment (UE).

Figure 6:
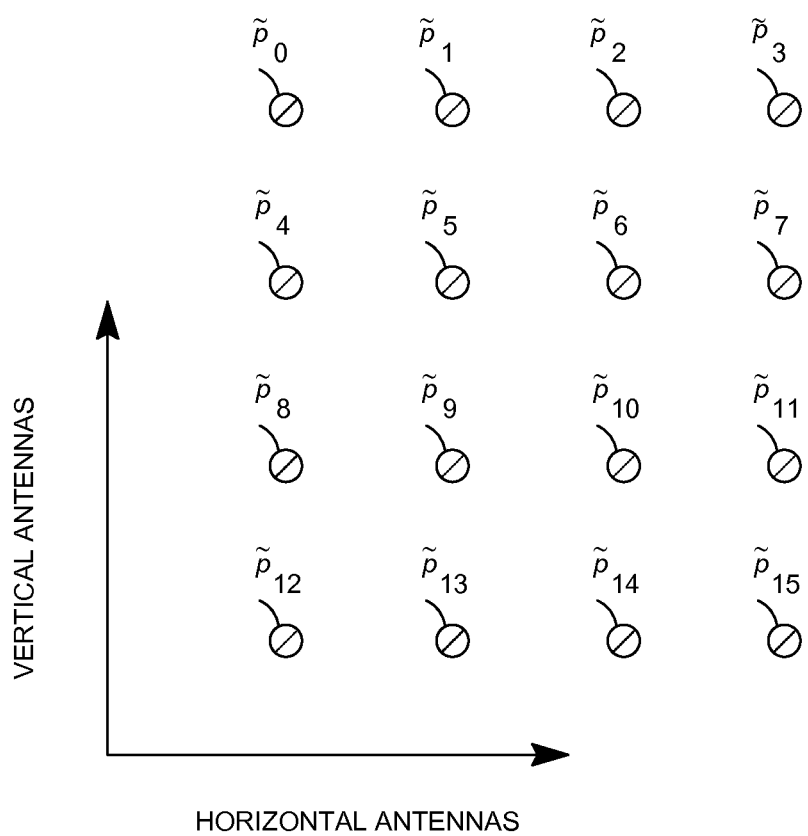
FIG. 6 is an example of antenna elements in a 2D antenna array.

FIG. 6 is an example of antenna elements in a 2D antenna array. As shown in FIG. 6, for example, 16 antenna elements may be used in a 2D antenna array. For example of virtualization, four antenna ports may be configured with the 16 antenna elements. A WTRU may recognize and/or see four antenna ports even though an eNB has 16 antenna elements.

For example, an antenna port may be configured with at least four antenna elements with a specific antenna virtualization vector. $p_0$ may be defined with four antenna elements $\tilde{p}_0, \tilde{p}_4, \tilde{p}_8, \tilde{p}_{12}$. $p_1$ may be defined with 4 antenna elements $\tilde{p}_1, \tilde{p}_4, \tilde{p}_9, \tilde{p}_{13}$. $p_2$ may be defined with four antenna elements $\tilde{p}_2, \tilde{p}_6, \tilde{p}_{10}, \tilde{p}_{14}$. $p_3$ may be defined with 4 antenna elements $\tilde{p}_3, \tilde{p}_7, \tilde{p}_{11}, \tilde{p}_{15}$. An antenna port may be seen as a reference signal in LTE/LTE-A, such as a cell-specific reference signal and/or a channel-state-information reference signal.

A reference signal in LTE/LTE-A may be classified as a WTRU-specific reference signal (WTRU-RS) and/or as a cell-specific reference signal (CRS). A WTRU-RS may be used for a specific WTRU, such that a WTRU-RS type RS is transmitted for resources allocated to the specific WTRU. A CRS may be shared by one or more, or all, WTRUs in a cell, such that a CRS type RS is transmitted in a wideband manner. Reference signal usage may be further distinguished and/or differentiated as a demodulation reference signal (DM-RS) and/or a channel-state-information reference signal (CSI-RS).

A DM-RS may be used for a specific WTRU. A DM-RS type RS may be precoded to exploit beamforming gain. A DM-RS type RS may be transmitted in time/frequency resources allocated to a WTRU given that a WTRU-specific DM-RS might not be shared with other WTRUs in the cell. A DM-RS may be used for demodulation purposes.

Figure 7:
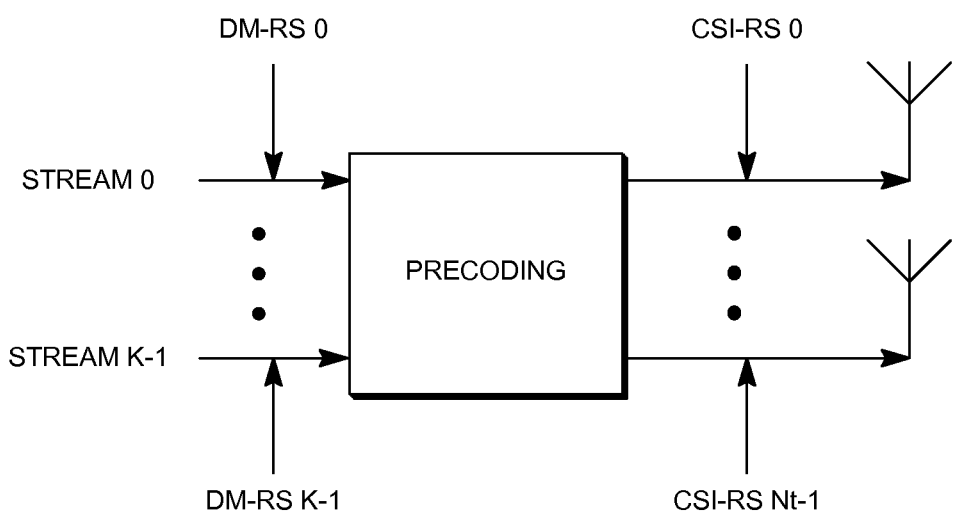
FIG. 7 is an example of WTRU-specific precoded demodulation reference signal.

FIG. 7 is an example of WTRU-specific precoded demodulation reference signal (DM-RS). FIG. 7 shows that an RS may be precoded with the same precoding used for data symbols, for example, perhaps when precoded DM-RS is employed. The same number of RS sequences corresponding to the number of layers K may be transmitted. K may be equal to, or smaller, than antenna ports $N_t$.

K streams may be allocated for a WTRU and/or shared with one or more, or multiple, WTRUs. Co-scheduled WTRUs may share the same time/frequency resources at the same time, for example, perhaps when one or more, or multiple, WTRUs share K streams. A measurement reference signal, such as CSI-RS, may be used together with precoded DM-RS for a WTRU to measure channel state information.

A CRS may be defined for one or more, or all, WTRUs in a cell. A CRS may be used for demodulation and measurement purposes. A non-precoded RS may be employed, e.g., to keep cell coverage uniform, given that a CRS may be shared by WTRUs. A precoded RS may have different cell coverage according to directions, for example, due to the beamforming effect.

Figure 8:
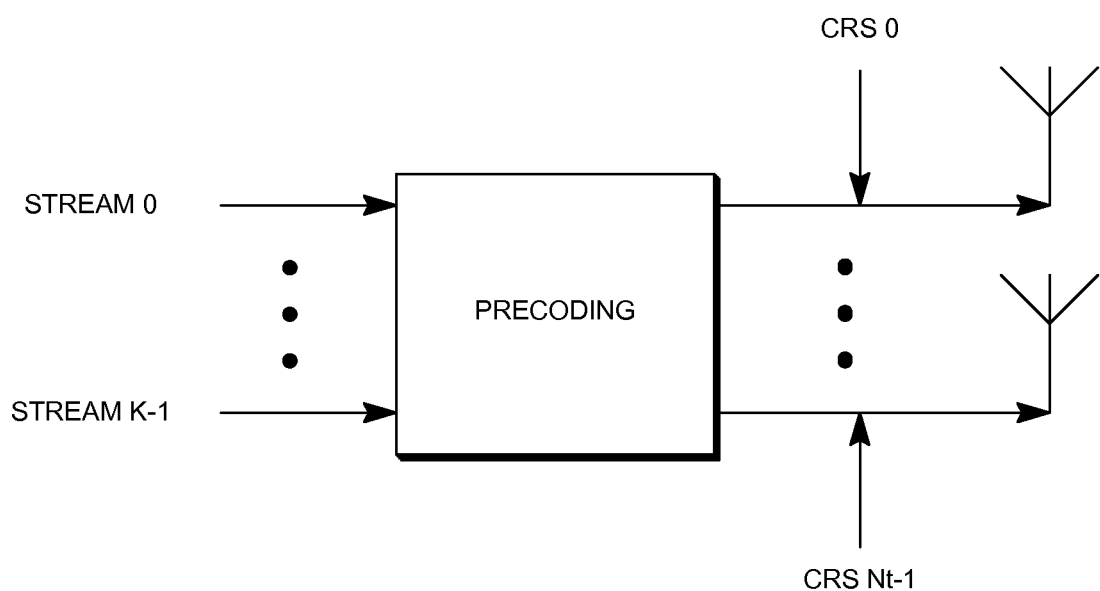
FIG. 8 is an example of a non-precoded cell-specific reference signal.

FIG. 8 is an example of a non-precoded cell-specific reference signal. FIG. 8 shows an example of a Multiple Input Multiple Output (MIMO) transmitter for non-precoded Cell-Specific Reference Signal (CRS) transmission. A WTRU transparent antenna virtualization may be used, for example, perhaps when the number of physical antenna elements and/or logical antenna port is different. RS sequences may be transmitted on antenna ports, e.g., one or more, or all, antenna ports, perhaps irrespective of the number of streams.

Figure 9:
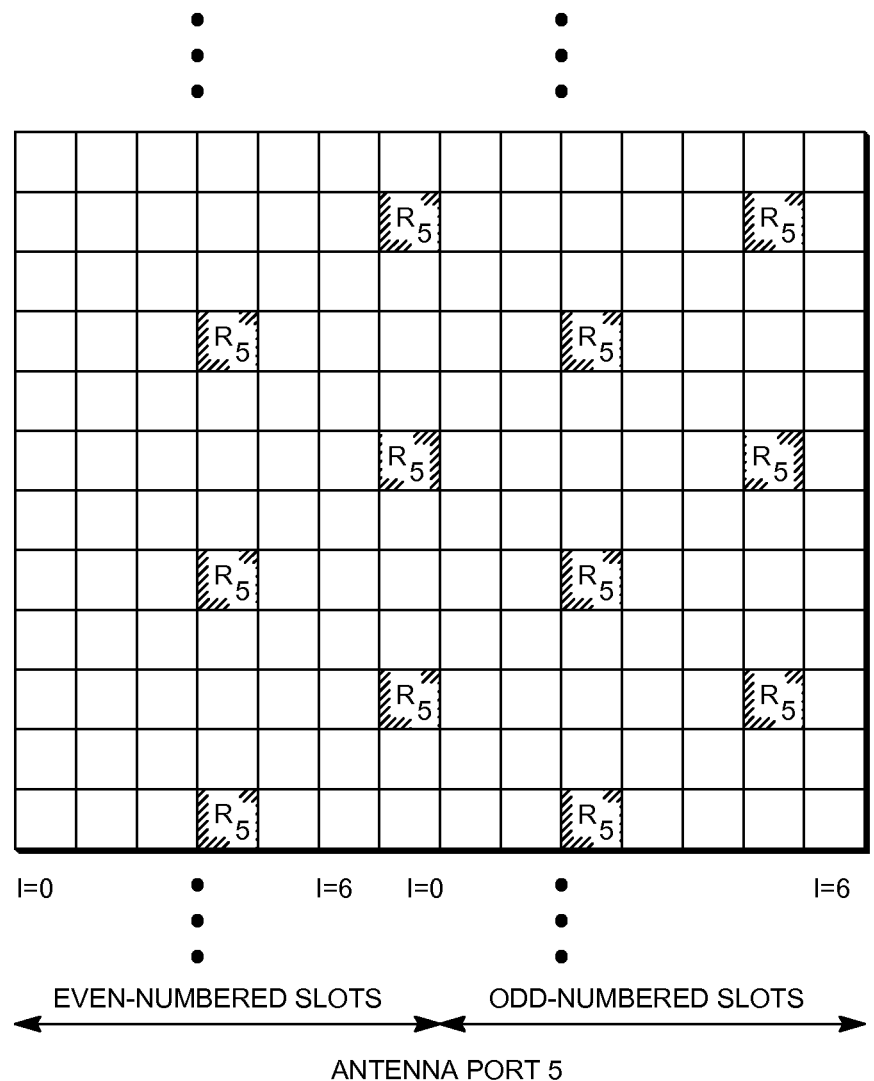
FIG. 9 is an example of a WTRU-specific demodulation reference signal for normal cyclic prefix.

Reference Signal (RS) structure in 3GPP LTE may vary. FIG. 9 is an example of a WTRU-specific demodulation reference signal for normal cyclic prefix. FIG. 9 shows a DM-RS for antenna port-5, which may be defined in LTE to support non-codebook based transmission at an eNB. Antenna port-5 may support one layer transmission. RS overhead may significantly increase, for example, if antenna port-5 is transmitted with CRS (e.g., one or more, or every time).

Figure 10:
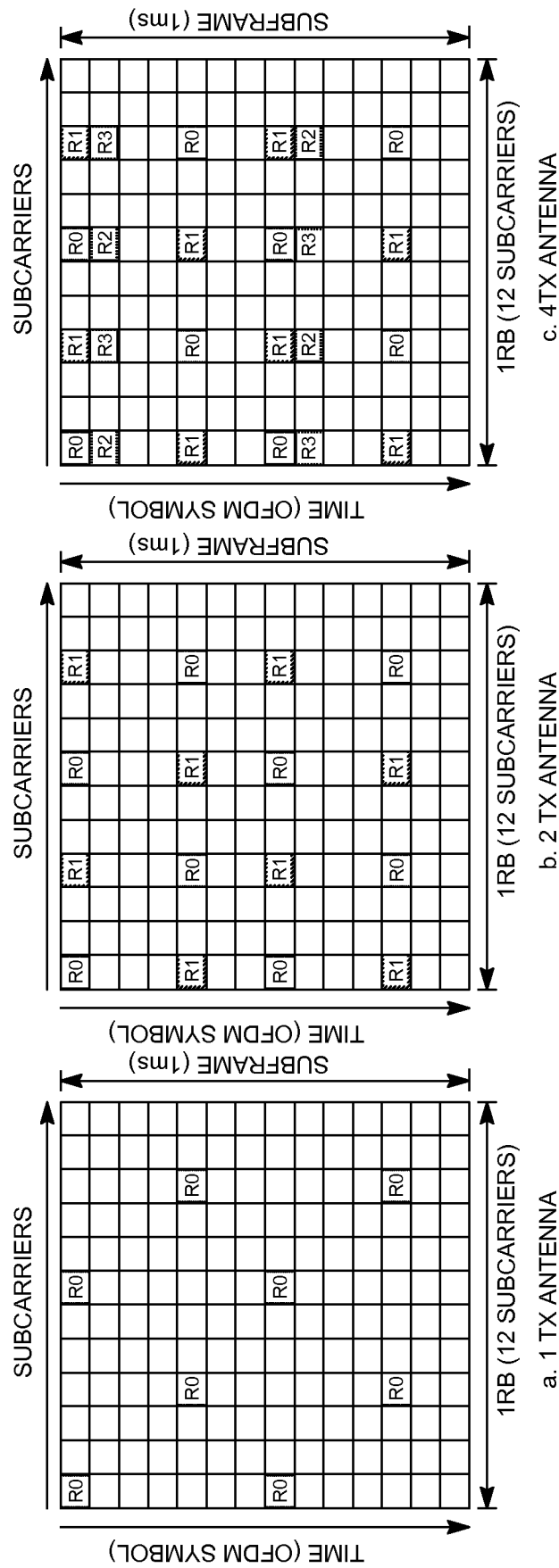
FIG. 10 is an example of a cell-specific reference signal structure according to one or more antenna ports.

FIG. 10 is an example of a cell-specific reference signal structure according to one or more, antenna ports. FIG. 10 shows a CRS pattern for one, two, and four antenna ports for normal CP. CRS patterns for one or more, or each, antenna port may be mutually orthogonal in time/frequency domain. R0 and R1 indicate CRS for antenna port 0 and antenna port 1, respectively. Data resource elements (REs) located at an RE where CRS antenna ports are transmitted may be muted, for example, to avoid interference between CRS antenna ports, among other scenarios.

A predefined RS sequence (e.g. Pseudo-random (PN)) may be transmitted in an RE location for CRS ports, for example, perhaps to minimize inter-cell interference. This may improve channel estimation accuracy from a CRS. A PN sequence may be applied, for example, at an Orthogonal Frequency Division Multiplexing (OFDM) symbol level in a subframe. The PN sequence may be defined, for example, according to cell-ID, subframe number, and/or position of OFDM symbol.

For example, the number of CRS antenna ports may be two in an OFDM symbol containing a CRS per Physical Resource block (PRB). The number of PRBs in LTE may vary from 6 to 110. A total number of CRS for an antenna port in an OFDM symbol containing RS may be two times the number of resource blocks (RBs), i.e., 2×NRB. The sequence length may be $2 \times N_{RB}^{DL}$. NRB may be the number of RBs corresponding to a bandwidth. The sequence may be binary or complex. A complex sequence, r(m), may be given by Eq. 1.

$$r(m) = \frac{1}{\sqrt{2}}(1 - 2 \cdot c(2m)) + j\frac{1}{\sqrt{2}}(1 - 2 \cdot c(2m+1)), \quad \text{Eq. 1}$$
$$m = 0, 1, \ldots, 2N_{RB}^{DL} - 1$$

In Eq. 1, $N_{RB}^{DL}$ denotes one or more RBs corresponding to the maximum bandwidth in an LTE system. $N_{RB}^{DL}$ may, for example, be 110, as described herein. C denotes a PN sequence with length equal to 31. C may be defined with Gold-sequence.

Complex sequence, r(m), may be given by Eq. 2, perhaps for example when a DM-RS may be configured, among other scenarios.

$$r(m) = \frac{1}{\sqrt{2}}(1 - 2 \cdot c(2m)) + j\frac{1}{\sqrt{2}}(1 - 2 \cdot c(2m+1)), \quad \text{Eq. 2}$$
$$m = 0, 1, \ldots, 12N_{RB}^{PDSCH} - 1$$

In Eq. 2, $N_{RB}^{PDSCH}$ denotes one or more of RBs allocated for a specific WTRU. A sequence length may vary, perhaps for example according to the number RBs allocated for a WTRU.

A reference signal (RS) structure in 3GPP LTE-A may vary from an RS structure in LTE. A DM-RS based downlink transmission in LTE-A may reduce RS overhead. CRS-based downlink transmission may transmit RS sequences for physical antenna ports. DM-RS based downlink transmission may reduce the RS overhead, for example, considering that the same number of RS as the number of layers may be used for DM-RS, among other reasons. The number of layers may be equal to, or smaller, than the number of physical antenna ports.

Figure 11:
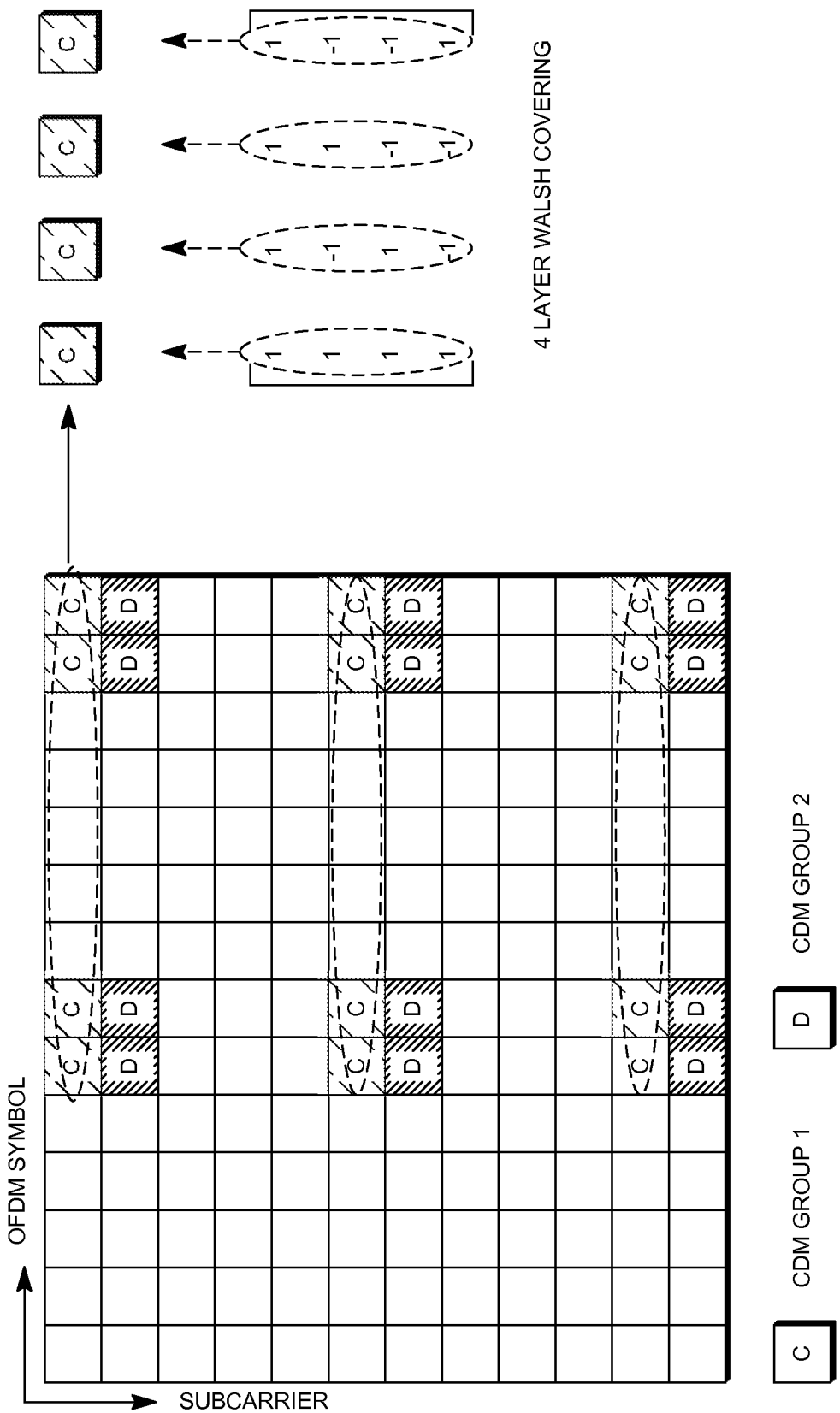
FIG. 11 is an example of a demodulation reference signal pattern supporting up to eight layers.

FIG. 11 is an example of a demodulation reference signal pattern supporting up to eight layers. FIG. 11 shows the DM-RS patterns in a PRB for a subframe with normal CP. For example, two Code Division Multiplexing (CDM) groups may be used for multiplexing up to four layers in one or more, or each, CDM group. Up to eight layers may be multiplexed in this pattern. A 4×4 Walsh spreading may be used, for example, for CDM multiplexing for one or more, or each, CDM group.

Figure 12:
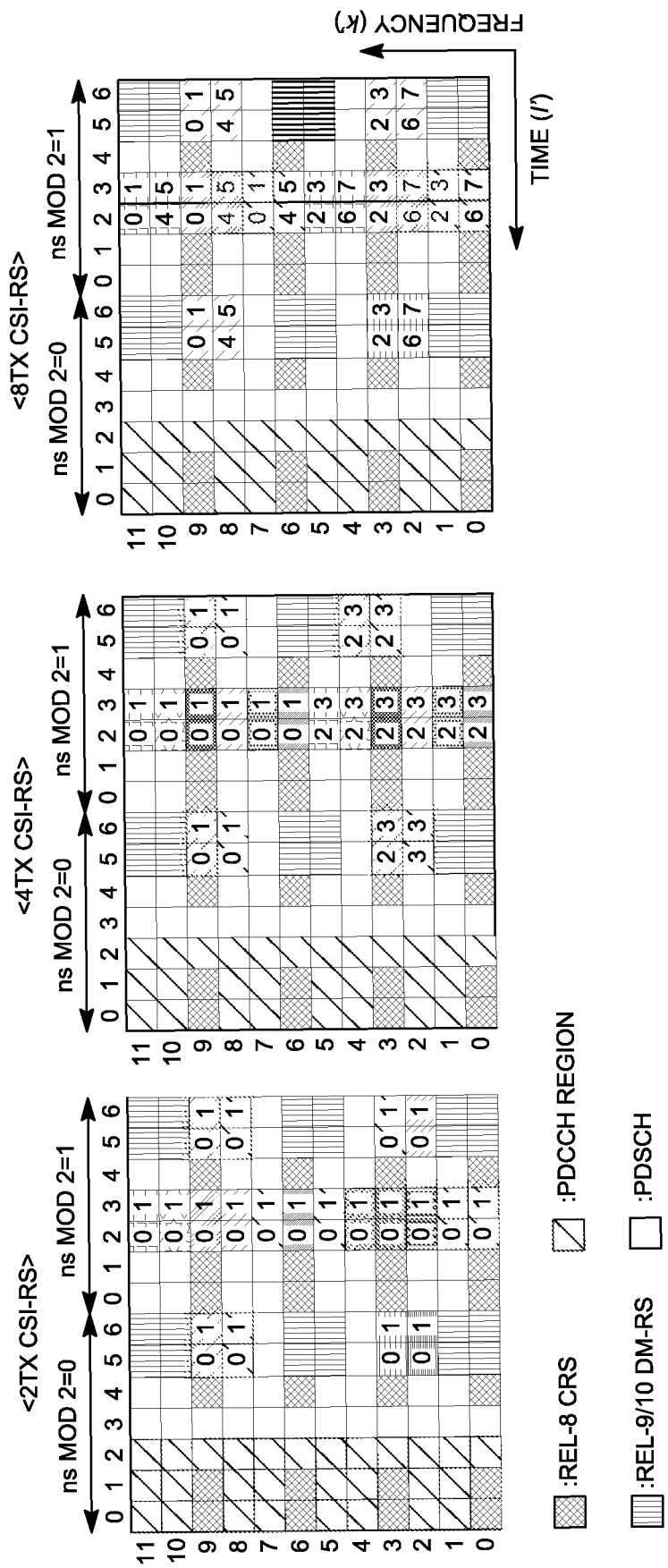
FIG. 12 is an example of channel state information reference signal pattern reuse according to one or more ports.

FIG. 12 is an example of channel state information reference signal pattern (CSI-RS) reuse according to a number ports. In FIG. 12, the same pattern indicates a set of REs for a particular CSI-RS configuration. A DM-RS may be used for demodulation performance. A time/frequency sparse CSI-RS may be introduced for measurement purposes. CSI-RS may be transmitted with a duty cycle {5, 10, 20, 40, 80} ms in PDSCH region. CSI-RS pattern reuse, e.g., up to 20, may be available in a subframe, as shown in FIG. 12.

Figure 13:
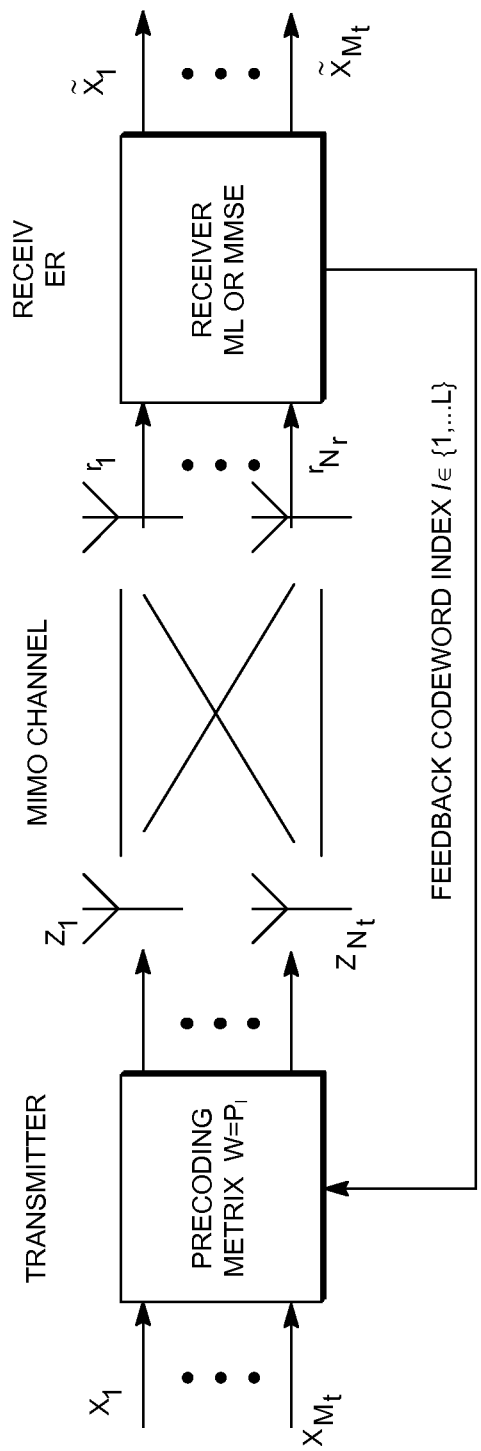
FIG. 13 is an example of codebook-based precoding with feedback information.

FIG. 13 is an example of codebook-based precoding with feedback information. Feedback information may be, for example, a precoding matrix index in codebook as shown in FIG. 13. Feedback information may be, for example, channel state information. Feedback information may be other information.

A codebook may include a set of precoding vectors/matrices for one or more, or each, rank and/or the number of antennas. One or more, or each, of the precoding vectors/matrices may have its own index. A receiver may inform a transmitter about a useful (e.g., relatively best optimized) precoding vector/matrix index. A transmitter may inform a receiver about which precoding vector/matrix index is applied for a transmission.

Codebook based precoding may have performance degradation, for example, due to a finite number of precoding vectors/matrices, which may contrast with non-codebook based precoding. Codebook-based precoding may be useful as it may lower control signaling/feedback overhead.

Table 1 and Table 2 show example codebooks for 2Tx and 4Tx employed in 3GPP.

TABLE 1

2Tx downlink codebook

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

Example 4Tx downlink codebook

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1234\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1234\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 2, $W_n^{(s)}$ is given by $W_n=I-2u_n u_n^H/u_n^H u_n$ in the set {s}. I denotes four-by-four identity matrix. The 2Tx codebook has seven precoding vectors/matrices. The identity matrix may be used for open-loop transmission. Six precoding vectors/matrices may be utilized for closed-loop transmission. The 4Tx codebook has 64 precoding matrix indexes, 16 of which may be used for one or more, or each, transmission rank.

Codebooks shown above may have common properties. For example, a common property may be a constant modulus (CM) property where one or more, or each, element in one or more, or each, precoding vector/matrix may have a unit power. A common property may be a nested property where a lower rank precoding vector/matrix may be a column subset of higher rank precoding vector/matrix. A common property may be a constrained alphabet where a precoding alphabet is constrained, for example, by $$\left\{\pm 1, \pm j, \pm \frac{(1+j)}{\sqrt{2}}, \pm \frac{(-1+j)}{\sqrt{2}}\right\}.$$

CSI feedback may be provided. At least two types of reporting channels may be used, such as Physical Uplink Control Channel (PUCCH) and Physical Uplink Shared Channel (PUSCH). A PUCCH reporting channel may provide CSI feedback, perhaps for example while allowing limited feedback overhead. A PUSCH reporting channel may allow a relatively large amount of feedback overhead, perhaps with less reliability. A PUCCH reporting channel may be used for periodic CSI feedback for coarse link adaptation, perhaps while a PUSCH reporting channel may be triggered aperiodically for finer link adaptation, for example. Table 3 illustrates an example of reporting modes.

TABLE 3

Reporting modes

| Scheduling Mode | Periodic CSI reporting channels | Aperiodic CSI reporting channel |
|---|---|---|
| Frequency non-selective | PUCCH | |
| Frequency selective | PUCCH | PUSCH |

CSI feedback may be reported in the format of rank (RI), precoder/precoding matrix index (PMI), and/or a channel quality indicator/indication (CQI). RI and/or PMI may be calculated at a WTRU receiver, for example, by selecting rank and/or precoding matrix in a predefined codebook. This may maximize WTRU throughput. PMI and/or CQI may be further classified into wideband, subband, and/or WTRU-selected subband. RI may be reported in wideband manner. Table 4 shows an example of CSI feedback according to transmission mode.

TABLE 4

Example of CSI feedback according to Reporting Modes

| Transmission Mode | Aperiodic Feedback | Periodic Feedback |
|---|---|---|
| 1 | Mode 2-0: WTRU selected subband CQI: WB CQI + CQI over M best subbands. | Mode 1-0: WB CQI |
| 2 | | Mode 2-0: WTRU Selected subband |
| 3 | | CQI: WB CQI + WTRU |
| 7 | Mode 3-0: high layer(HL) configured subband CQI: WB CQI + subband CQI. Notes: CQI for first CW, No PMI | reports CQI in useful subband in one or more, or each, BW part, one BW part in one or more, or each, reporting opportunity. Notes: CQI for first CW, No PMI |
| 8 | | |
| 4 | Mode 1-2: WB CQI/Multiple | Mode 1-1: WB CQI/Single PMI |

TABLE 4-continued

Example of CSI feedback according to Reporting Modes

| Transmission Mode | Aperiodic Feedback | Periodic Feedback |
|---|---|---|
| 6<br>8 | PMI: CQI for one or more, or each, CW; PMI for one or more, or each, subband.<br>Mode 2-2: WTRU selected subband CQI/Multiple PMI: CQI per CW and PMI, both over full BW and M best subbands.<br>Mode 3-1: HL configured subband CQI/Single PMI: WB CQI + subband CQI, both per CW. | Mode 2-1: WTRU selected subband CQI/Single PMI (if $N_{RB}^{DL} >7$): WB CQI/PMI + WTRU reports CQI in useful subband in one or more, or each, BW part |
| 5 | Mode 3-1: HL configured subband CQI/Single PMI (see above) | |

Periodic feedback may be transmitted on a PUCCH channel. Periodic feedback may be transmitted on a PUSCH channel, for example, perhaps when that channel exists. Aperiodic feedback may be requested by DCI Format 0 and/or DCI format 4, for example, perhaps when the Channel Quality Indications (CQI) Request bit is set. Aperiodic feedback may be transmitted on Physical Uplink shared Channel (PUSCH).

Figure 14:
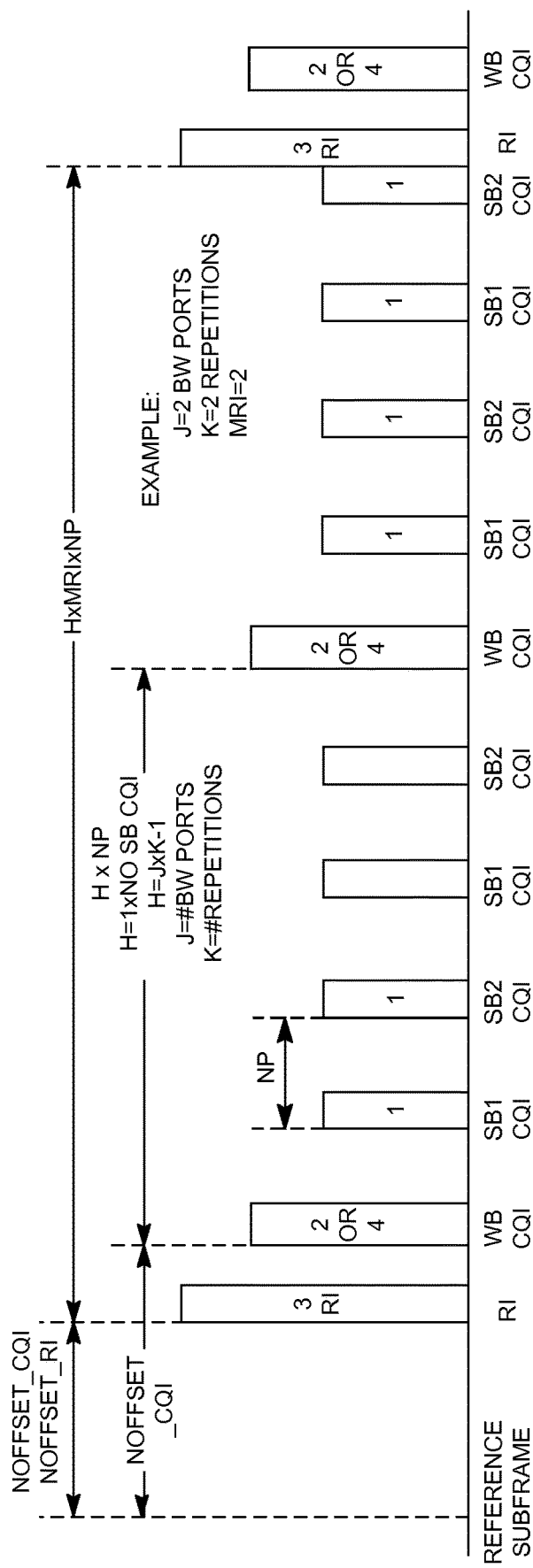
FIG. 14 is an example of periodic reporting.

FIG. 14 is an example of periodic reporting. Periodic reporting may use a sequence of different types of reports. Report types may be defined. For example, Type 1 may be Subband CQI, Type 2 may be Wideband CQI/PMI, Type 3 may be RI, and/or Type 4 may be Wideband CQI. FIG. 14 shows an example of a reporting sequence, where the number in one or more, or each, rectangle corresponds to a report type.

Types of periodic Physical Uplink Control Channel (PUCCH) feedback may be extended for up to eight Tx antenna ports. For example, Type 1 report may support CQI feedback for WTRU selected sub-bands. Type 1a report may support subband CQI and/or second PMI feedback. Type 2, Type 2b, and/or Type 2c report may support wideband CQI and/or PMI feedback. Type 2a report may support wideband PMI feedback. Type 3 report may support Rank Indicator (RI) feedback. Type 4 report may support wideband CQI. Type 5 report may support RI and/or wideband PMI feedback. Type 6 report may support RI and/or PTI feedback. In a Type 6 report, precoding type indicator (PTI) may be used for eight transmit antenna ports, for example, given that an 8Tx precoder may be defined with a dual codebook.

Antenna virtualization may be used in a cell-specific manner, perhaps for example transparent to a receiver and/or irrespective of receiver location and/or channel characteristics. In some circumstances, MIMO performance might not be fully optimized. Suboptimal performance may be more pronounced for example, perhaps when a transmitter is equipped with a large number of antenna elements.

An antenna virtualization scheme may be determined and/or optimized according to one or more WTRU channel characteristics. A WTRU-specific antenna virtualization may (e.g., relatively fully) exploit the MIMO gain. WTRU-specific antenna virtualization may be applied in at least a two-dimensional antenna array. Antenna virtualization may be defined, for example, based on antenna port to antenna element mapping, based on a measurement reference signal, based on a codebook or a codebook subset, and/or based on an antenna virtualization matrix. WTRU-specific antenna virtualization may enable one or more, or multiple, antenna virtualization schemes to be configured in a cell. Antenna virtualization schemes may be configured in a WTRU-specific manner, perhaps for example based on one or more WTRU channel characteristics. A WTRU may report a useful (e.g., relatively best optimized) antenna virtualization scheme based on a measurement.

MIMO performance may be optimized with a relatively larger number of antenna elements (for example, which may be considered physical antennas). One or more antenna virtualization schemes may be useful, for example, to (e.g., fully) exploit the degree of freedom of one or more MIMO channels. One or more antenna virtualization schemes may allow formation of antenna ports (for example, which can be considered logical antennas). $N_E$ antenna elements may be virtualized to $N_P$ antenna ports. MIMO schemes (e.g. as simplified) may be used with a reduced feedback, reference signal, and/or control signaling overhead.

In one or more techniques, antenna virtualization, antenna virtualization scheme, antenna virtualization method, antenna virtualization configuration, logical antenna configuration, and/or virtual antenna configuration may be used interchangeably.

Antenna virtualization may be defined as one or more antenna port to antenna element mapping rules. For example, $N_E$ antenna elements may be mapped to $N_P$ antenna ports, for example, when $N_E$ antenna elements may be used at the transmitter. One or more mapping rules between $N_E$ antenna elements and $N_P$ antenna ports may be considered as antenna port to antenna element mapping rules.

Figure 15:
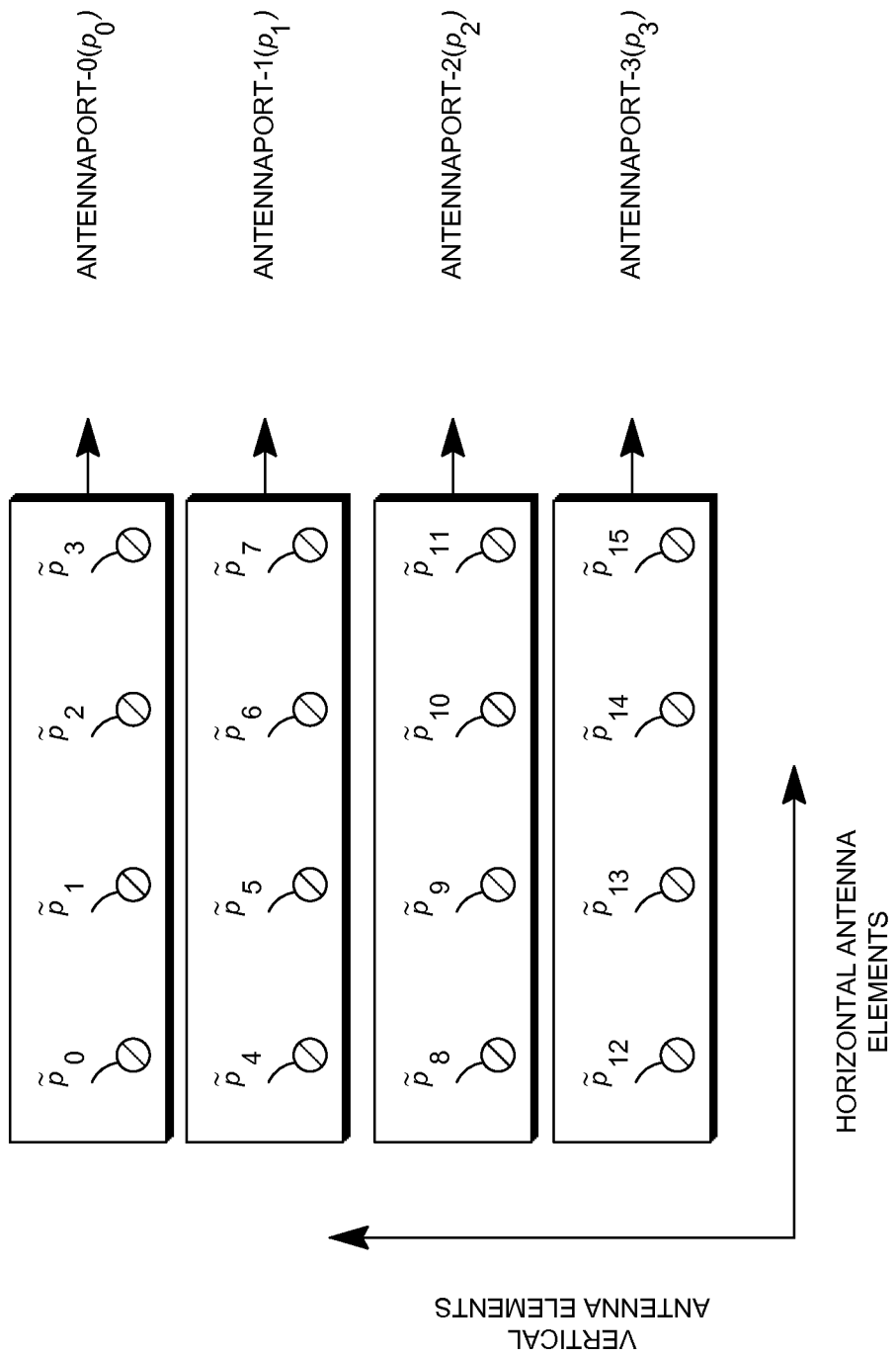
FIG. 15 is an example of antenna port to antenna element mapping.

FIG. 15 is an example of antenna port to antenna element mapping. More specifically, FIG. 15 shows an example of antenna port to antenna element mapping, perhaps for example when 16 antenna elements ($N_E$=16) are used at a transmitter and 4 antenna ports ($N_P$=4) are defined. Antenna elements in a row may be mapped to an antenna port.

One or more antenna port to antenna element mapping rules may be defined, perhaps for example as a set of indices. Referring to FIG. 15, for example where 16 antenna elements are used at the transmitter and four antenna ports are defined. One or more, or each, of the four antenna ports may have a set of antenna element indices. For example, where $P_0$={0, 1, 2, 3}, $P_1$={4, 5, 6, 7}, $P_2$={8, 9, 10, 11} and $P_3$={12, 13, 14, 15}, antenna port 0 may be formed with antenna elements 0, 1, 2, and 3; antenna port 1 may be formed with the antenna elements 4, 5, 6, and 7; antenna port 2 may be formed with the antenna elements 8, 9, 10, and 11; and/or antenna port 3 may be formed with the antenna elements 12, 13, 14, and 15.

For example, such as in the previous example, an antenna element may be mapped onto at least one antenna port. For example, an antenna element may be mapped onto at least two, or more, antenna ports. For example, an antenna element may be mapped onto at least two, or more, antenna ports, such as $P_0=\{0, 1, 2, 3, 4, 5, 6, 7\}$, $P_1=\{4, 5, 6, 7, 8, 9, 10, 11\}$, $P_2=\{8, 9, 10, 11, 12, 13, 14, 15\}$, and/or $P_0=\{12, 13, 14, 15, 0, 1, 2, 3\}$, and/or the like.

One or more antenna ports may be the same and/or similar as the number of antenna elements. Antenna port to antenna element mapping may be one-to-one correspondence, perhaps for example where $N_E$ may be the same as $N_P$ (e.g., $N_E=N_P$), among other scenarios.

Antenna virtualization may be defined as one or more cells. For example, an $N_C$ cell may be configured using antenna virtualization given $N_E$ antenna elements used for a transmitter.

A cell-ID to antenna element mapping may be used and/or one or more sets of antenna elements may be determined, perhaps for example based on a cell-ID (e.g., a physical cell-ID and/or a virtual cell-ID). One or more, or each, cell may have the same or similar number of assigned antenna ports. For example, perhaps where four cells are defined with 16 antenna elements (e.g., $N_C=4$ and $N_E=16$), one or more, or each, cell may be mapped onto 4 antenna elements. This arrangement may be represented as Cell-1=$\{0, 1, 2, 3\}$, Cell-2=$\{4, 5, 6, 7\}$, Cell-3=$\{8, 9, 10, 11\}$ and Cell-4=$\{12, 13, 14, 15\}$.

An antenna element may be mapped onto cell-IDs. For example, an antenna element may be mapped onto one or more, or all, cell-IDs, which may be represented as Cell-1=$\{0, 1, \ldots, 15\}$, Cell-2=$\{0, 1, \ldots, 15\}$, Cell-3=$\{0, 1, \ldots, 15\}$ and Cell-4=$\{0, 1, \ldots, 15\}$.

A different complex weight may be used for one or more, or each, cell. A complex weight for one or more, or each, cell may be defined as an $N_P \times N_E$ matrix. $N_P$ may be the number of antenna ports for a cell. For example, $N_P$ may be different according to the cell. For example, $N_P$ may be the same for one or more, or all, cells.

$N_C$ cells may be considered as one or more vertical sectors. One or more $N_C$ cells may have the same physical cell ID and/or different physical cell IDs. A common CRS may be used for one or more $N_C$ cells. A different CSI-RS configuration may be used for one or more, or each, $N_C$ cell. A CSI for a vertical sector may be configured as a CSI process. A virtual cell-ID may be assigned for one or more, or each, CSI-RS configuration. A WTRU may be requested to report CSI for one or more configured $N_C$ cells. One or more $N_C$ cells may be defined as independent cells. A different physical cell ID may be assigned for one or more $N_C$ cells.

Antenna virtualization may be defined, by way of explanation, as an antenna virtualization matrix, among other definitions. For example, an $N_P \times N_E$ antenna virtualization matrix may be defined as an antenna virtualization scheme.

Figure 16:
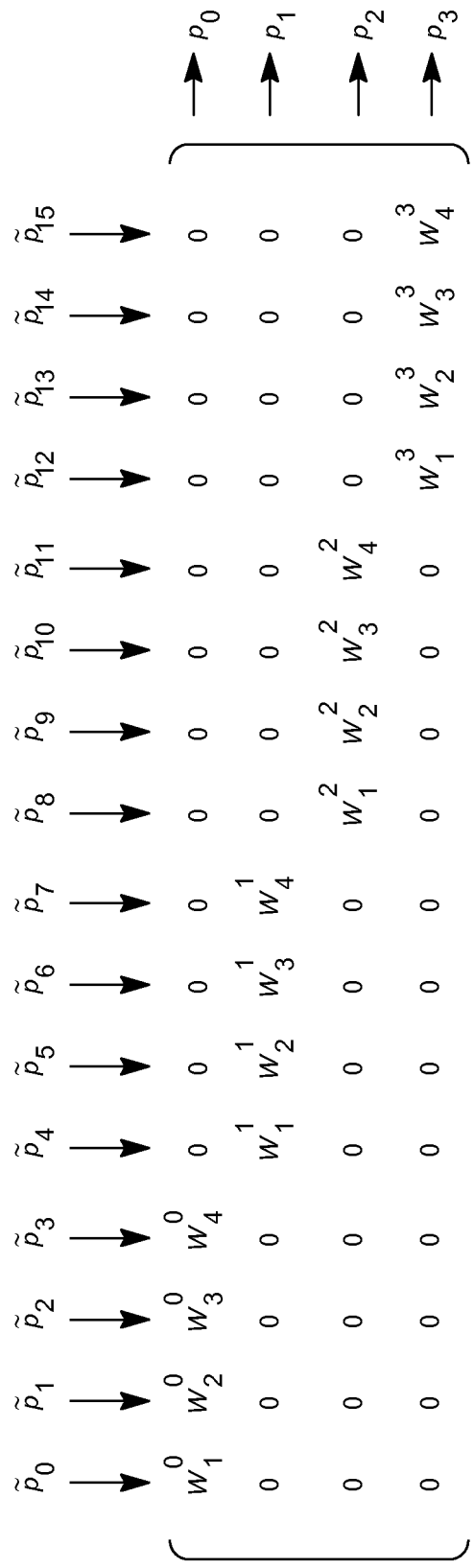
FIG. 16 is an example of an antenna virtualization matrix.

FIG. 16 is an example of defining antenna virtualization as an antenna virtualization matrix. FIG. 16 shows an example definition of antenna virtualization as an antenna virtualization matrix where $N_E=16$ and $N_P=4$. One or more different antenna virtualization schemes may have one or more different antenna virtualization matrices.

An antenna port may be formed, for example, by associating a row vector with a complex weight vector. An antenna element may be formed, for example, by associating a column vector with a complex weight vector.

In one or more techniques, $N_P$ may be the same as $N_E$, which may be referred to as unity. An antenna virtualization matrix for unity may be an identity matrix where the antenna element and antenna port are the same, perhaps for example such that physical antennas are the same as logical antennas. An antenna virtualization matrix for unity may be a permutation matrix, perhaps for example where antenna port to antenna element mapping may be one to one correspondence, perhaps for example while indexes may be permutated. An antenna virtualization matrix for unity may be a DFT matrix, perhaps for example where $N_P$ number of beams may be formed with $N_E$ antenna elements, perhaps for example such that one or more, or each, antenna port may correspond to a beam. An antenna virtualization matrix for unity may be a phase shift matrix.

An antenna virtualization matrix may have complex weights $w_k^n$, e.g., as shown in FIG. 16, where $w_k^n$ is a complex weight for k-th antenna element to map onto n-th antenna port. A complex weight may be determined as a function of an antenna virtualization scheme (e.g., matrix or matrices).

Antenna virtualization may be defined as a measurement reference signal configuration. For example, a measurement reference signal may be configured with two components, such as for example vertical antennas and horizontal antennas. One or more antenna ports for vertical antennas and/or horizontal antennas may be dependent on the antenna virtualization scheme. One or more antenna ports for vertical antennas and/or horizontal antennas may be the same or different according to an antenna virtualization scheme. For example, the antenna virtualization scheme/matrix may include configuration information for at least one of an antenna port for a vertical antenna and/or at least one of an antenna port for a horizontal antenna.

At least one measurement reference signal may be CSI-RS. CSI-RS may have at least two components, such as for example vertical CSI-RS (v-CSI-RS) and/or horizontal CSI-RS (h-CSI-RS). One or more antenna ports for v-CSI-RS and h-CSI-RS may be defined commonly and/or independently. One or more antenna ports for v-CSI-RS may be determined as a function of the number of antenna port for h-CSI-RS. $N_V \times N_H$ may be $N_V$ antenna ports for v-CSI-RS and/or $N_H$ antenna ports for h-CSI-RS, for example.

One or more antenna virtualization schemes may be defined as one or more codebooks, which may contain one or more precoding vectors/matrices. For example, a codebook may be used for CSI feedback and/or indication of a transmitted precoding matrix index (or indices).

A codebook may contain precoding vectors/matrices according to rank, perhaps for example where rank may one or more layers that may be simultaneously transmitted.

A codebook may be defined according to a CSI-RS configuration(s). A codebook may be defined/configured as a function one or more antenna ports for CSI-RS. A codebook may be defined/configured as a function of one or more antenna ports for combination of v-CSI-RS and/or h-CSI-RS.

A different or similar codebook may be used according to an antenna virtualization scheme(s). For example, a codebook for an antenna virtualization scheme 1 (e.g., the numerical references used for illustration/explanation and not for limitation) may be different from, or similar to, a codebook for antenna virtualization scheme 2. For example, the number of antenna ports used for antenna virtualization scheme 1 and antenna virtualization scheme 2 may be the same or different.

One or more antenna virtualization schemes may be defined as a codebook subset. For example, for one or more antenna ports for a measurement reference signal (e.g., CSI-RS), at least one codebook may be defined and/or at least one subset of the codebook may be used for an antenna virtualization scheme.

A codebook subset(s) may be defined as a bitmap(s). $N_{CB}$ bits may be used to define the codebook subset(s), for example, perhaps when $N_{CB}$ precoders may be defined in a codebook(s). For example, perhaps where $N_{CB}$ may be eight, a codebook subset for a first antenna virtualization scheme may be defined as $\{11110000\}$ and/or a codebook subset for a second antenna virtualization scheme may be defined as $\{00001111\}$. The first four codewords in a codebook may be defined as a codebook subset for the first antenna virtualization and/or the last four codewords in a codebook may be defined as a codebook subset for the second antenna virtualization. A codebook subset for a first antenna virtualization scheme and/or a codebook subset for a second antenna virtualization scheme may be mutually exclusive or overlapped, e.g., partially overlapped.

A codebook subset may be determined as a function of one or more antenna ports for vertical antennas (e.g. v-CSI-RS) and/or one or more antenna ports for horizontal antennas (e.g. h-CSI-RS). A WTRU configured with a codebook subset may determine a useful (e.g., relatively best optimized) precoding vector/matrix index within the codebook subset, for example, perhaps when the WTRU reports CSI.

One or more antenna virtualization schemes and/or one or more antenna virtualization types may be used interchangeably.

One or more WTRU-specific antenna virtualization schemes may be configured. For example, one or more, or multiple, antenna virtualization schemes may be defined/configured in a cell(s). One or more antenna virtualization schemes $N_{AV}$ may be configured in a cell(s). $N_{AV}$ may be similar or different for one or more, or each, cell. $N_{AV}$ may be defined as a function of physical cell-ID. $N_{AV}$ may be signaled via higher layer signaling.

One or more antenna ports may be the same for one or more, or all, antenna virtualization schemes. Different mapping rules, codebook, codebook subset, reference signal configuration, and/or antenna virtualization matrix may be used.

One or more, or multiple antenna virtualization types may be defined/configured. An antenna virtualization type (e.g. type-A—which is a label used for explanation/illustration and not limitation) may use horizontal antenna elements to form an antenna port. An antenna virtualization type (e.g. type-B) may use vertical antenna elements to form an antenna port. An antenna virtualization type (e.g. type-C) may use horizontal and/or vertical antenna elements to form an antenna port.

Figure 17:
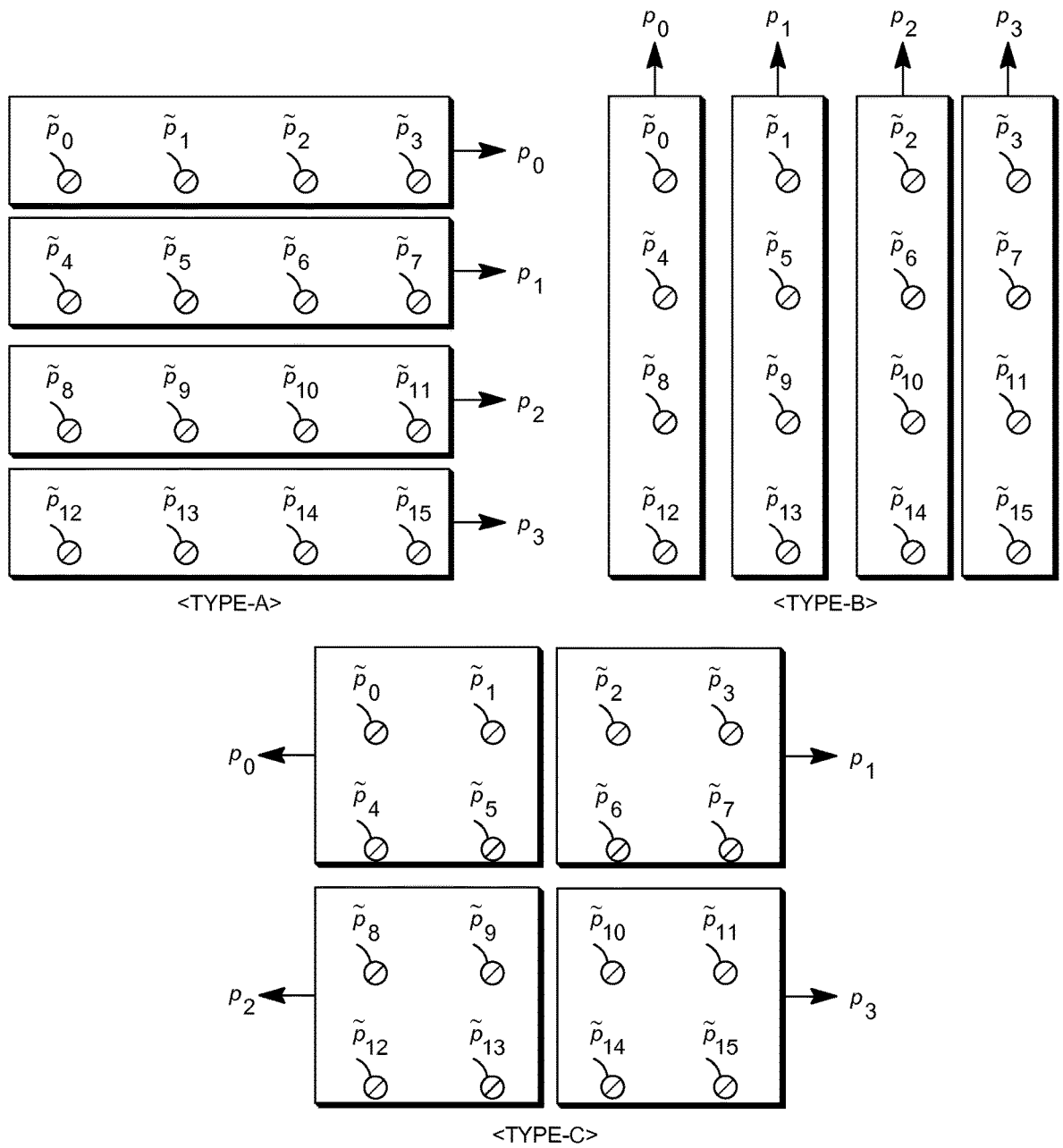
FIG. 17 is an example of multiple types of antenna virtualization.

FIG. 17 is an example of one or more, or multiple, types of antenna virtualization. In the example shown in FIG. 17, $N_{AV}=3$. For one or more, or each, of three virtualization schemes, $N_E=16$ and/or $N_P=4$. FIG. 17 shows one or more antenna port to antenna element mapping rules may be defined/configured in a cell(s). Similar or different mapping rules may apply for one or more, or each, antenna virtualization scheme.

One or more, or multiple, measurement reference signals may be configured as antenna virtualization schemes. A measurement reference signal may be, for example, a CSI-RS. One or more, or multiple, configured measurement reference signals may have the same or different number of antenna ports.

For example, of the same number of antenna ports, a total number of antenna ports may be the same for one or more, or all, configured measurement reference signals, perhaps for example while the number of antenna ports for vertical and/or horizontal antennas may be different. A first configured measurement reference signal may have 4×2 ($N_V \therefore N_H$) antenna configurations, perhaps for example while a second configured measurement reference signal may have 2×4 antenna configurations. A CSI-RS pattern may be determined as a function of the total number of antenna ports. A CSI-RS pattern may be determined as a function of the number of vertical and/or horizontal antennas.

One or more, or multiple, CSI-RS may be configured where one or more, or each, CSI-RS may be associated with a certain codebook. For example, a first CSI-RS may be associated with the first codebook and/or a second CSI-RS may be associated with a second codebook. The first codebook and the second codebook may be the same or different.

For example, CSI-RS-1 may be associated with codebook-1 and/or CSI-RS-2 may be associated with codebook-2. Codebook-1 and/or codebook-2 may be defined together or independently. Codebook-1 and codebook-2 may be, or might not be, mutually exclusive. Codebook-1 and codebook-2 may be a subset of a codebook. CSI-RS and/or an associated codebook may be configured, for example, via higher layer signaling. The same or a different codebook may be configured for two or more CSI-RS configurations.

A WTRU may use an associated measurement reference signal to report CSI, for example, perhaps when a WTRU may be configured with a codebook and/or codebook subset. A codebook and/or a codebook subset may be tied with a measurement reference signal for antenna virtualization.

A WTRU may use an associated measurement reference signal to report CSI, for example, perhaps when a WTRU may be configured with a transmission mode. For example, two CSI-RSs may be configured. A WTRU may use CSI-RS-1 for CSI measurement, for example, perhaps when a WTRU may be configured with a first transmission mode (e.g. TM-1). A WTRU may use CSI-RS-2 for CSI measurement, for example, perhaps when the WTRU may be configured with a second transmission mode (e.g. TM-2). A transmission mode may be tied with a measurement reference signal for antenna virtualization.

One or more, or multiple, configured measurement reference signals may have a similar or different number of antenna ports. One or more, or multiple, CSI-RS may be configured with a similar or different number of antenna ports. For example, one or more CSI-RS on par with one or more antenna virtualization schemes $N_{AV}$ may be configured. A first CSI-RS may have two antenna ports, a second CSI-RS may have four antenna ports, and so on, for example. For example, CSI-RS used for measurement may be determined by one or more of a configured transmission mode, a configured codebook, and/or a measured WTRU location. One or more, or each, measurement reference signal may be associated with a codebook.

One or more, or multiple, antenna virtualization matrices may be defined/configured. One or more antenna virtualization matrices may be configured as an antenna virtualization codebook(s). For example, $N_{AV}$ antenna virtualization matrices may be defined in a codebook. An index may be used to indicate which antenna virtualization matrix is used (e.g., an antenna virtualization matrix index).

An antenna virtualization codebook may contain two or more antenna virtualization matrices, which may, for example, be defined as an $N_P \times N_E$ complex matrix. Codewords, for example, antenna virtualization matrices, in the antenna virtualization codebook may have the same $N_E$. For example, codewords may have the same or different $N_P$. An antenna virtualization codebook may be predefined. A subset of antenna virtualization codebook may be configured, for example, via higher layer signaling.

An antenna virtualization scheme may be configured in a WTRU-specific manner. A WTRU may be configured, for example, via higher layer signaling, to assume a certain antenna virtualization.

An antenna virtualization may be configured for a WTRU in a semi-static manner. WTRU-specific RRC signaling may be used to indicate an antenna virtualization scheme used for a WTRU.

For example, a CSI reporting mode may be determined as a function of an antenna virtualization scheme. Aperiodic CSI reporting may be used in a first antenna virtualization scheme. Periodic CSI reporting may be used in a second antenna virtualization scheme. For example, a codebook and/or a codebook subset may be determined as a function of an antenna virtualization scheme. Two or more codebooks may be defined. One codebook may be used according to an antenna virtualization configuration. Two or more codebook subsets may be defined. One codebook subset may be used according to an antenna virtualization configuration.

A transmission mode may be defined as a function of an antenna virtualization scheme. For example, an open-loop transmission mode may be used for a first antenna virtualization scheme. A closed-loop transmission mode may be used for a second antenna virtualization scheme. An open-loop transmission mode may be a transmission mode without PMI reporting, perhaps for example where CQI and/or RI may be reported. A closed-loop transmission mode may be a transmission mode with PMI reporting, perhaps for example where PMI may be reported with CQI and/or RI. A WTRU may measure a different number of CSI-RS ports in accordance with a configured antenna virtualization scheme, for example, perhaps when a different antenna virtualization may have a different number of antenna ports.

A default antenna virtualization scheme may be broadcasted in an SIB. A WTRU may use a default antenna virtualization scheme, for example, perhaps, even if, or unless, configured with another antenna virtualization scheme. A default antenna virtualization scheme may be a cell specific antenna virtualization. A default antenna virtualization scheme may be a cell-specific reference signal (CRS).

A codebook subset restriction field may be used to indicate an antenna virtualization scheme.

An eNB may configure a different antenna virtualization scheme according to a WTRU location. For example, an eNB may configure a first antenna virtualization scheme when a WTRU is located at a low elevation (e.g., ground level in a building). An eNB may configure a second antenna virtualization scheme, perhaps for example when a WTRU is located at a high elevation (e.g. a high floor level of a building).

A first and second antenna virtualization scheme may have similar or different antenna configurations. For example, 2×4 antenna configurations may be used for a first antenna virtualization scheme. For example, 4×2 antenna configurations may be used for a second antenna virtualization scheme. First and second antenna virtualization schemes may have a different number of antenna ports.

An eNB may configure one or more (e.g., different) antenna virtualization schemes, perhaps for example, according to one or more WTRU channel characteristics. For example, an eNB may configure an antenna virtualization scheme according to angle of arrival in azimuth and/or elevation of an uplink signal from a WTRU. For example, an eNB may configure an antenna virtualization scheme according to an angular spread of azimuth and/or elevation of an uplink signal from a WTRU. An uplink signal may be one or more of PUSCH, DM-RS, PUCCH, and/or Sounding Reference Signal (SRS).

In one or more techniques, the plurality of antenna virtualization scheme (e.g., matrices) may be preconfigured on the WTRU. In one or more techniques, the WTRU may receive the plurality of antenna virtualization schemes (e.g., matrices) from a network node, such as for example an eNB.

In one or more techniques, a WTRU may determine an antenna virtualization matrix index that may correspond to at least one antenna virtualization matrix. The at least one antenna virtualization matrix may be one that the WTRU has determined to be optimal, for example. At least one of the codebook or a subset of the codebook may correspond to the antenna virtualization matrix index. The WTRU may send the antenna virtualization matrix index to a network node, such as an eNB. The WTRU may receive from the eNB a confirmation of the at least one antenna virtualization matrix, and/or an indication of another antenna virtualization matrix of the plurality of virtualization matrices (e.g., an index corresponding to another antenna virtualization matrix). The WTRU may change from an antenna virtualization matrix that the WTRU determined to another antenna virtualization matrix (e.g., that the eNB may have indicated), perhaps for example upon receipt of an indication of another antenna virtualization matrix (e.g., an index of another antenna virtualization matrix sent by an eNB).

An antenna virtualization scheme may be used for WTRU transmit antennas. For example, a WTRU may use one or more antenna elements $N_E$ at a transmitter. An eNB may configure an antenna virtualization scheme to the $N_E$ antenna elements to form $N_P$ antenna ports.

$N_E$ antenna elements used at a WTRU transmitter may be a 2D antenna array. $N_P$ may be equal to, or smaller than, one or more antenna ports that may be used for uplink transmission. A MIMO scheme may support $N_P$ antenna ports in the system.

One or more, or multiple, types of SRS may be defined. A first type of SRS may be transmitted in antenna elements. A second type of SRS may be transmitted with antenna virtualization. A first type of SRS may be defined as $N_E$ ports. A second type of SRS may be defined as $N_P$ ports.

An antenna virtualization scheme may be defined as one or more of an antenna port to element mapping rule and/or an antenna virtualization matrix.

An uplink MIMO scheme may be dependent on one or more antenna virtualization schemes that may be configured for WTRU transmit antennas, for example. An uplink MIMO scheme may be used, for example, perhaps when $N_E$ may be larger than a certain number predefined ($N_{MAX}$). An antenna port mode may be used (for example a single antenna port), for example, perhaps when $N_E$ may be larger than $N_{MAX}$ and/or an antenna virtualization scheme might not be configured. An antenna port mode may be considered (for example a single antenna port) as a default MIMO scheme. A MIMO scheme associated with $N_P$ antenna ports may be used, for example, perhaps when $N_E$ may be larger than $N_{MAX}$ and/or an antenna virtualization scheme may be configured. For example, $N_{MAX}$ may be four. A MIMO scheme associated with $N_E$ antenna ports may be used, for example, perhaps when $N_E$ may be equal to or smaller than $N_{MAX}$ and/or an antenna virtualization scheme might not be configured. A WTRU may use a MIMO scheme associated with $N_P$ antenna ports, for example, perhaps when a WTRU may be configured with an antenna virtualization scheme for the WTRU transmit antennas.

A dynamic indication may be used to adapt an antenna virtualization scheme, for example, perhaps for example when at least one of a set of configured antenna virtualization schemes may be indicated and/or other virtualization schemes may be available to adapt.

A Downlink control Information (DCI) used for aperiodic reporting may be used to indicate an antenna virtualization scheme for the CSI measurement. A WTRU may be requested and/or triggered to report aperiodic CSI by a DCI. The DCI may include information for antenna virtualization. A WTRU may assume a certain antenna virtualization scheme indicated in the DCI for the CSI measurement. An antenna virtualization scheme may be one or more of a CSI-RS configuration, antenna virtualization matrix, codebook, and/or antenna port to antenna element mapping.

An antenna virtualization indication field may be defined in a DCI used for aperiodic reporting triggering. An antenna virtualization indication field may be activated/deactivated by eNB. An antenna virtualization indication field may be activated in a DCI according to a configured transmission mode. A group DCI may be used to indicate an antenna virtualization scheme. For example, a group Radio Network Temporary Identifier (RNTI) may be defined to indicate an antenna virtualization scheme. A WTRU configured with a group RNTI may assume that an antenna virtualization scheme is indicated in the DCI.

An implicit antenna virtualization adaptation may be used. For example, a WTRU may assume an associated antenna virtualization scheme, for example, perhaps when a WTRU may be configured with a transmission mode.

An antenna virtualization scheme may be determined as a function of one or more of a subframe number, a system frame number (SFN), and/or an OFDM symbol number in a subframe. For example, a WTRU measurement of a CSI in a subframe may (e.g., implicitly) indicate an antenna virtualization scheme, for example, based on a subframe number and/or an SFN number. An associated codebook for an antenna virtualization scheme may be used for CSI reporting.

An antenna virtualization scheme may be determined as a function of a virtual cell-ID. An antenna virtualization scheme may be derived from the virtual cell-ID configured for a CSI-RS, for example, perhaps when a CSI-RS may be configured with a virtual cell-ID. For example, a modulo operation may be used to derive an antenna virtualization scheme for a virtual cell-ID.

A WTRU may report a configured (e.g. useful, such as a relatively best optimized) antenna virtualization scheme among a set of antenna virtualization schemes.

A WTRU may report a useful (e.g., such as a relatively best optimized) antenna virtualization scheme from among a set of defined and/or configured antenna virtualization schemes. A WTRU reporting of a useful (e.g., such as a relatively best optimized) antenna virtualization scheme may be periodic and/or aperiodic. An eNB may be triggered to report a useful (e.g., such as a relatively best optimized) antenna virtualization scheme. A bit field may be defined for useful (e.g., such as a relatively best optimized) antenna virtualization scheme reporting in a DCI used for aperiodic reporting triggering. A useful antenna virtualization scheme reporting may be event-triggered. A WTRU may measure an antenna virtualization scheme and/or report to an eNB for a useful (e.g., such as a relatively best optimized) antenna virtualization scheme. For example, the WTRU may measure an antenna virtualization scheme and/or report to an eNB for a useful (e.g., such as a relatively best optimized) antenna virtualization scheme, perhaps when a CQI for a certain antenna virtualization scheme may be lower than a predefined threshold.

An antenna virtualization scheme may be defined as one or more of a CSI-RS configuration, codebook, and/or feedback mode. One or more, or multiple, antenna virtualization schemes may be configured. An antenna virtualization scheme may be a CSI-RS. Associated codebooks for one or more, or each, CSI-RS may be defined independently. A WTRU may determine a useful (e.g., such as a relatively best optimized) antenna virtualization scheme. A WTRU may measure CSI for a CSI-RS configured with its associated codebook. A WTRU may select an antenna virtualization scheme, for example, that may provide the highest throughput performance based on the measured CSI.

Systems, methods, and instrumentalities are contemplated for antenna virtualization in at least a two-dimensional antenna array. $N_E$ physical antenna elements may be virtualized to $N_P$ logical antenna ports. A virtualization may be WTRU-specific, which may optimize MIMO performance. A simplified MIMO scheme may be used with reduction in feedback, reference signal, and/or control signaling overhead. One or more antenna virtualization schemes may utilize channel characteristics. Antenna virtualization may be defined, for example, based on antenna port to antenna element mapping, based on a measurement reference signal, based on a codebook and/or a codebook subset, and/or based on an antenna virtualization matrix. One or more, or multiple, antenna virtualization schemes may be configured in a cell. Antenna virtualization schemes may be configured in a WTRU-specific manner, perhaps for example based on one or more WTRU channel characteristics. A WTRU may report a useful (e.g., such as a relatively best optimized) antenna virtualization scheme, e.g., based on a measurement.

A WTRU may refer to an identity of the physical device, or to the user's identity such as subscription related identities, e.g., MSISDN, SIP URI, etc. WTRU may refer to application-based identities, e.g., user names that may be used per application.

The processes and instrumentalities described herein may apply in any combination, may apply to other wireless technologies, and for other services. Although features and elements are described herein in example combinations, one of ordinary skill in the art will appreciate that one or more, or each, feature or element can be used alone or in any combination with any of the other features and elements. The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU (UE), terminal, base station, RNC, and/or any host computer.

What is claimed is:

1. A method performed by a wireless transmit/receive unit (WTRU), the method comprising:
   transmitting an uplink antenna configuration information to a network, wherein the uplink antenna configuration information is associated with the WTRU;
   receiving a radio resource control (RRC) indication from the network;
   determining a codebook subset based on the received RRC indication;
   determining a precoding matrix index based on the determined codebook subset; and
   performing an uplink transmission using the determined precoding matrix index.

2. The method of claim 1, wherein the uplink antenna configuration information is preconfigured on the WTRU.

3. The method of claim 1, further comprising:
   determining a channel state information reference signal (CSI-RS) configuration corresponding to the uplink antenna configuration information.

4. The method of claim 1, wherein the uplink antenna configuration information is at least one of a plurality of antenna virtualization configurations.

5. The method of claim 1, wherein the uplink antenna configuration information is associated with uplink antenna ports.

6. The method of claim 1, wherein the method further comprises:
   determining precoding information based on the codebook subset; and
   transmitting the determined precoding information to the network.

7. A wireless transmit/receive unit (WTRU), comprising:
   a processor configured to:
      transmit an uplink antenna configuration information to a network, wherein the uplink antenna configuration information is associated with the WTRU;
      receive a radio resource control (RRC) indication from the network;
      determine a codebook subset based on the received RRC indication;
      determine a precoding matrix index based on the determined codebook subset; and
      perform an uplink transmission using the determined precoding matrix index.

8. The WTRU of claim 7, wherein the uplink antenna configuration information is at least one of a plurality of antenna virtualization configurations.

9. The WTRU of claim 7, wherein the processor is further configured to:
   determine a channel state information reference signal (CSI-RS) configuration corresponding to the uplink antenna configuration information.

10. The WTRU of claim 7, wherein the uplink antenna configuration information is preconfigured on the WTRU.

11. The WTRU of claim 7, wherein the uplink antenna configuration information is associated with uplink antenna ports.

12. The WTRU of claim 7, wherein the processor is further configured to:
   determine precoding information based on the codebook subset; and
   transmit the determined precoding information to the network.

* * * * *